(12) United States Patent
Bienas et al.

(10) Patent No.: US 9,191,966 B2
(45) Date of Patent: Nov. 17, 2015

(54) COMMUNICATION DEVICE AND METHOD FOR COMMUNICATING IN A COMMUNICATION MODE USING A FREQUENCY RANGE ACCORDING TO A FRAME STRUCTURE

(75) Inventors: Maik Bienas, Braunschweig (DE); Hyung-Nam Choi, Hamburg (DE); Frank Jira, Nuremberg (DE)

(73) Assignee: INTEL MOBILE COMMUNICATIONS GMBH, Neubiberg (DE)

(*) Notice: Subject to any disclaimer, the term of this patent is extended or adjusted under 35 U.S.C. 154(b) by 1114 days.

(21) Appl. No.: 12/749,578

(22) Filed: Mar. 30, 2010

(65) Prior Publication Data

US 2011/0243261 A1    Oct. 6, 2011

(51) Int. Cl.
| | | |
|---|---|---|
| *H04W 72/12* | (2009.01) | |
| *H04L 5/00* | (2006.01) | |
| *H04W 36/00* | (2009.01) | |
| *H04W 36/06* | (2009.01) | |
| *H04W 88/06* | (2009.01) | |

(52) U.S. Cl.
CPC ........... *H04W 72/1215* (2013.01); *H04L 5/003* (2013.01); *H04L 5/0007* (2013.01); *H04W 36/0072* (2013.01); *H04W 36/06* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2009/0040970 A1 | 2/2009 | Ahmadi et al. | |
| 2009/0047984 A1 | 2/2009 | Gollamudi et al. | |
| 2010/0061284 A1 | 3/2010 | Chen et al. | |
| 2012/0113941 A1* | 5/2012 | Chung et al. | 370/329 |
| 2012/0182958 A1* | 7/2012 | Pelletier et al. | 370/329 |

FOREIGN PATENT DOCUMENTS

| | | |
|---|---|---|
| EP | 1277288 B1 | 12/2004 |
| EP | 2073463 A1 | 6/2009 |
| EP | 2086256 A1 | 8/2009 |
| WO | 0051304 A1 | 8/2000 |
| WO | 0239614 A2 | 5/2002 |
| WO | 2006041557 A2 | 4/2006 |

(Continued)

OTHER PUBLICATIONS

3GPP TS 36.211, V0.2.0., 3rd Generation Partnership Project, "Physical Channels and Modulation", (Release 8), Nov. 2006, pp. 1-22.

(Continued)

*Primary Examiner* — Jackie Zuniga Abad
(74) *Attorney, Agent, or Firm* — Schwabe, Williamson & Wyatt, P.C.

(57) ABSTRACT

According to one embodiment, a communication device is described comprising a communication circuit configured to communicate in a first communication mode using a first frequency range and a receiver configured to receive a switching delay information message indicating a time interval by which start of communication in a second communication mode using a second frequency range should be delayed after a switch from the first communication mode to the second communication mode. The communication circuit is configured to communicate in the second communication mode when the time interval has elapsed since the start of the switching from the first communication mode to the second communication mode.

23 Claims, 20 Drawing Sheets

(56) References Cited

FOREIGN PATENT DOCUMENTS

| WO | 2009105933 | A1 | 9/2009 |
|---|---|---|---|
| WO | 2010099271 | A2 | 9/2010 |
| WO | 2011040852 | A1 | 4/2011 |

OTHER PUBLICATIONS

RP-080137, "Proposed SID on LTD-Advanced", NTT DoCoMo, Mar. 4-7, 2008, Puerto Vallarta, Mexico, pp. 1-5.

3GPP TS 36.913, V8.0.0., 3rd Generation Partnership Project, Requirements for further advancements for E-UTRA, (LTE-Advanced), (Release 8), Jun. 2008, pp. 1-14.

3GPP TR 36.814, V0.4.1., 3rd Generation Partnership Project, "Further Advancements for E-UTRA—Physical Layer Aspects", (Release 9), Feb. 2009, pp. 1-31.

English language abstract for EP 2086256 dated Aug. 5, 2009.

Chinese Patent Office; First Office Action for Chinese App. No. 201110078271.5 mailed May 2, 2013, 19 pages inclusive of English translation.

German Patent Office; Office Action for German App. No. 102011001393.8 mailed Oct. 6, 2011; 8 pages.

\* cited by examiner

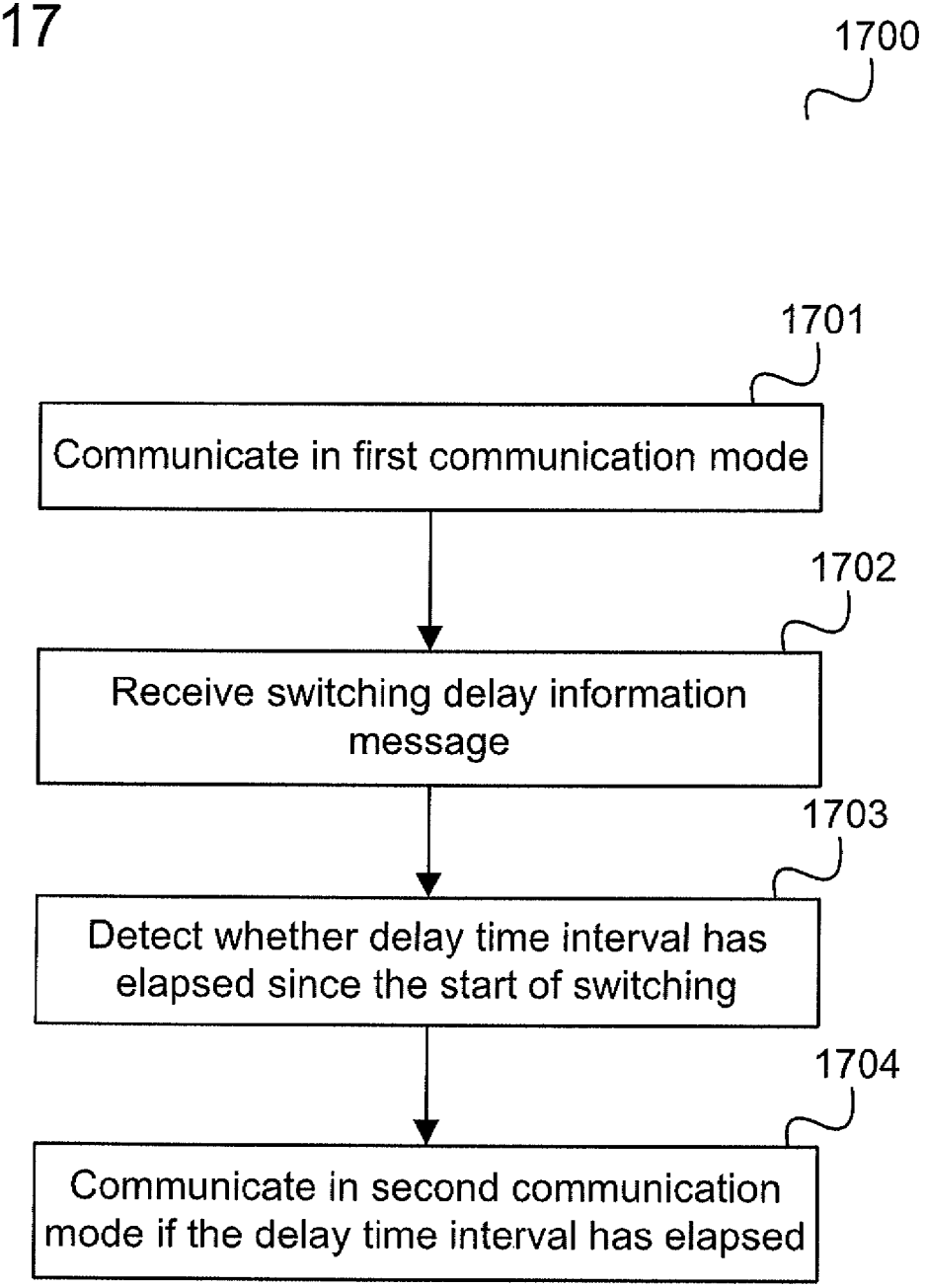

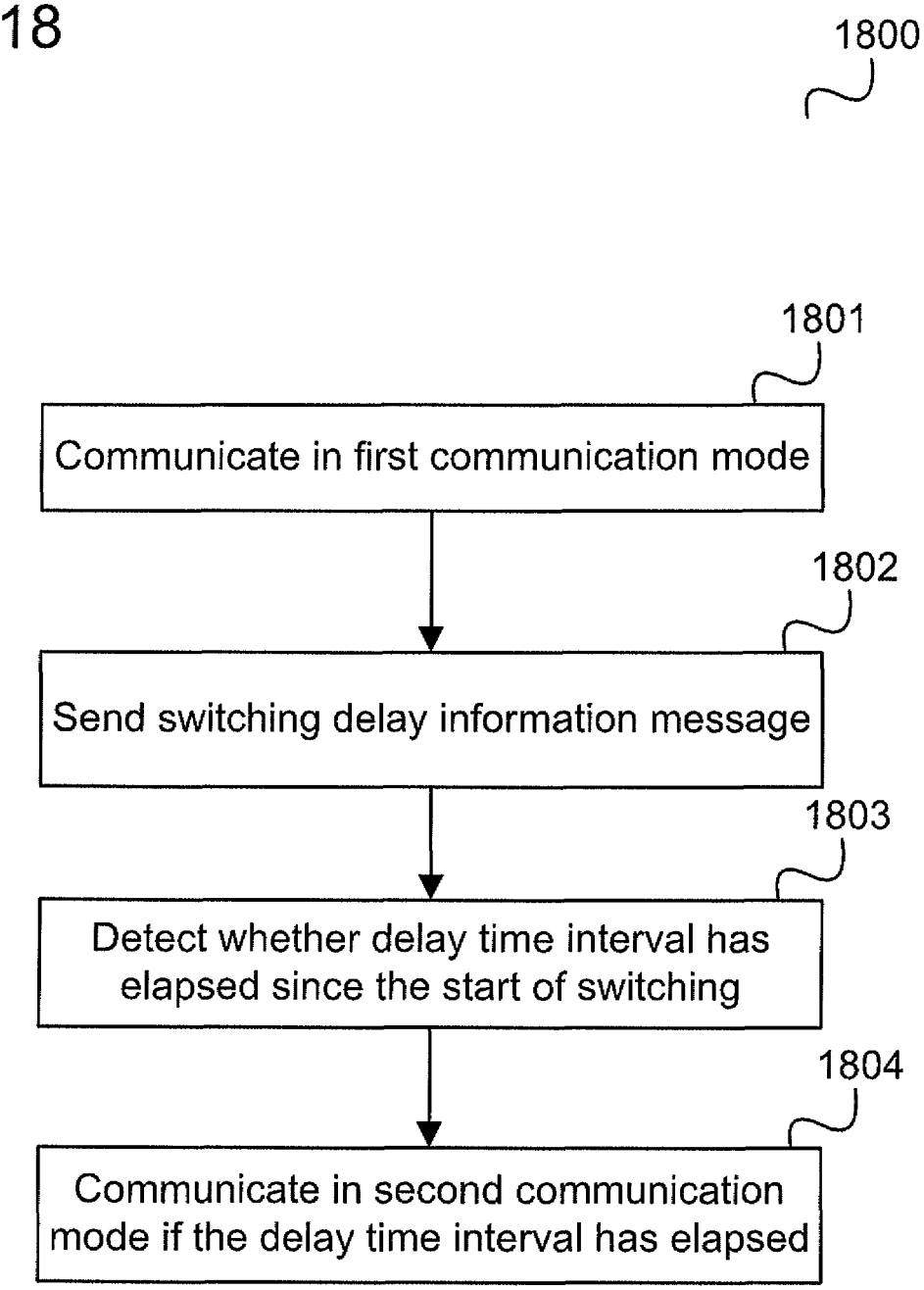

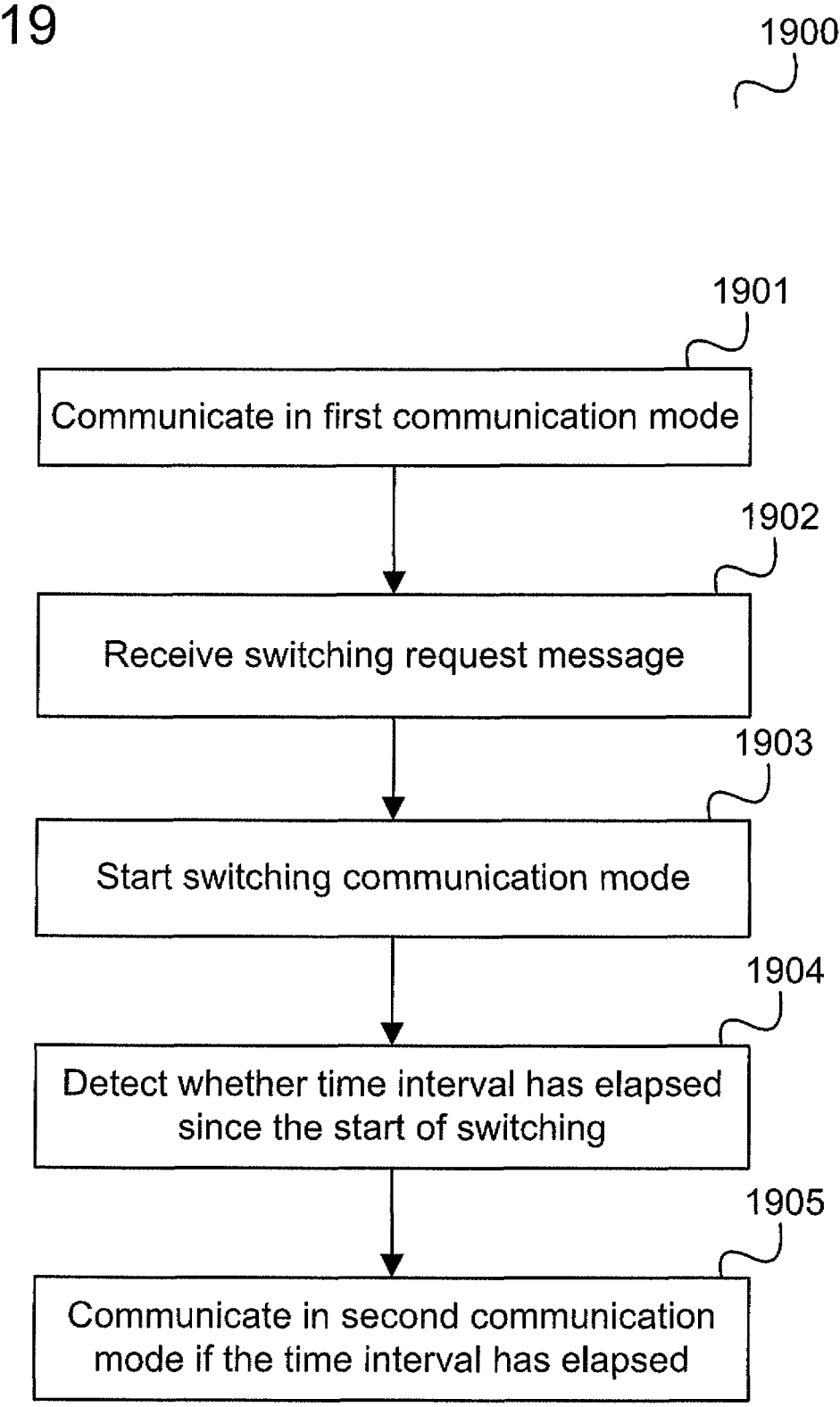

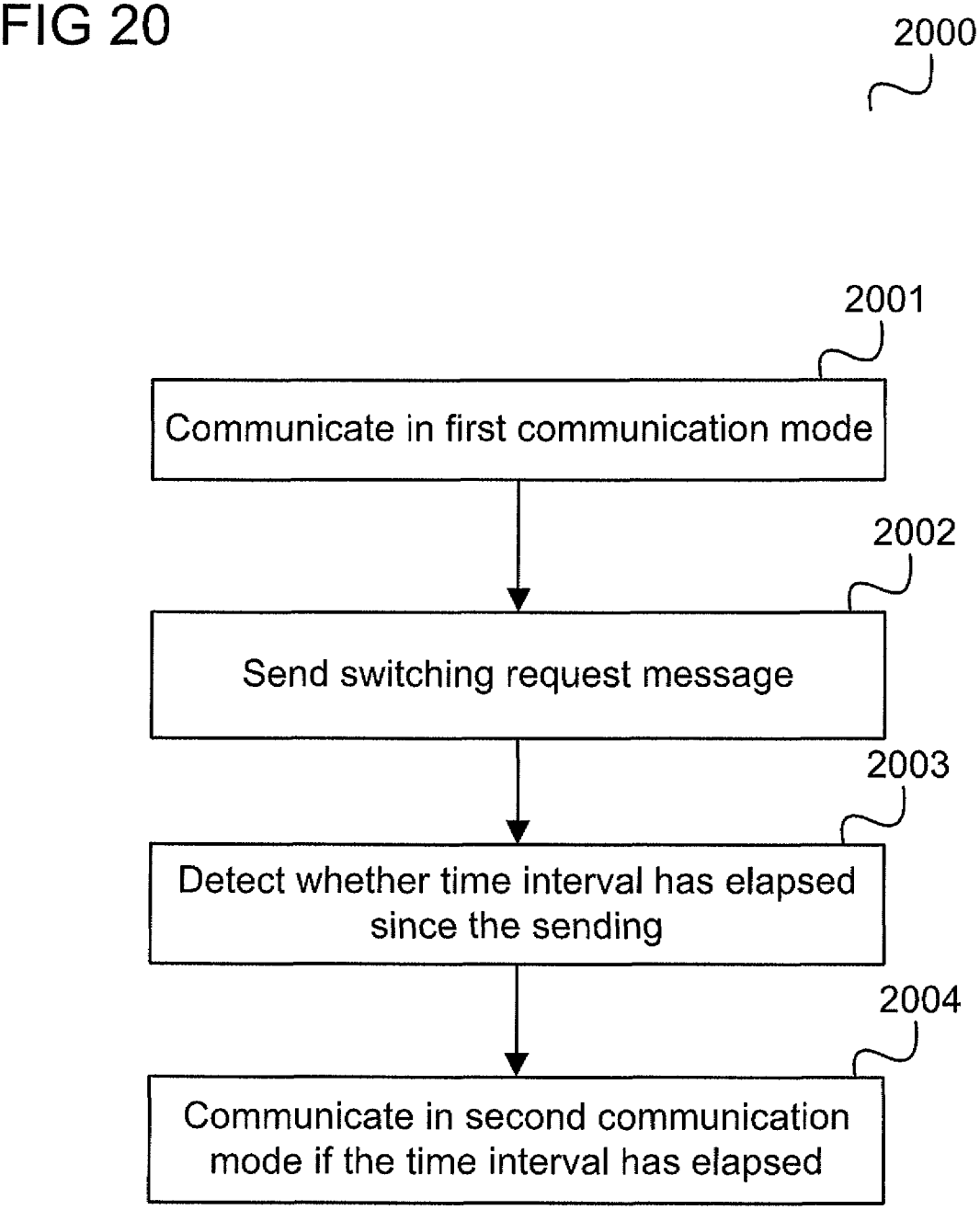

COMMUNICATION DEVICE AND METHOD FOR COMMUNICATING IN A COMMUNICATION MODE USING A FREQUENCY RANGE ACCORDING TO A FRAME STRUCTURE

TECHNICAL FIELD

Various embodiments relate generally to communication devices.

BACKGROUND

3GPP (3rd Generation Partnership Project) has introduced LTE (Long Term Evolution) into the Release 8 version of UMTS (Universal Mobile Telecommunication System) standards. With LTE, the UMTS air interface is further optimized for packet data transmission by improving the system capacity and the spectral efficiency.

A current topic in the 3GPP standardization for a is the study on further advancements of LTE (Long Term Evolution), also referred to as LTE-Advanced. One of the key characteristics of LTE-Advanced is the support of bandwidths >20 MHz and up to 100 MHz by spectrum aggregation, i.e. the bandwidth of an LTE-Advanced (LTE-A) radio cell is divided into a number of so-called component carriers (CC), wherein the bandwidth size of each component carrier is limited to a maximum of 20 MHz.

Efficient and reliable methods for operating base stations and mobile devices in such a configuration are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 17 shows a flow diagram.

FIG. 18 shows a flow diagram.

FIG. 19 shows a flow diagram.

FIG. 20 shows a flow diagram.

DESCRIPTION

3GPP (3rd Generation Partnership Project) has introduced LTE (Long Term Evolution) into the Release 8 version of UMTS (Universal Mobile Telecommunication System) standards. With LTE the UMTS air interface is further optimized for packet data transmission by improving the system capacity and the spectral efficiency. Amongst others, the maximum net transmission rate is increased significantly, namely to 300 Mbps in the downlink transmission direction and to 75 Mbps in the uplink transmission direction. Further, LTE supports scalable bandwidths of 1.4, 3, 5, 10, 15, and 20 MHz and is based on the multiple access methods OFDMA/TDMA (orthogonal frequency division multiple access/time division multiple access) in downlink and SC-FDMA/TDMA (single carrier-frequency division multiple access/TDMA) in uplink. OFDMA/TDMA is a multicarrier multiple access method in which a subscriber is provided with a defined number of subcarriers in the frequency spectrum and a defined transmission time for the purpose of data transmission. The RF bandwidth capability of an LTE UE (user equipment) for transmission and reception has been set to 20 MHz. A physical resource block (PRB) is the baseline unit of allocation for the physical channels defined in LTE. A physical resource block includes a matrix of 12 subcarriers by 6 or 7 OFDMA/SC-FDMA symbols. A pair of one OFDMA/SC-FDMA symbol and one subcarrier is denoted as resource element.

Figure 1:
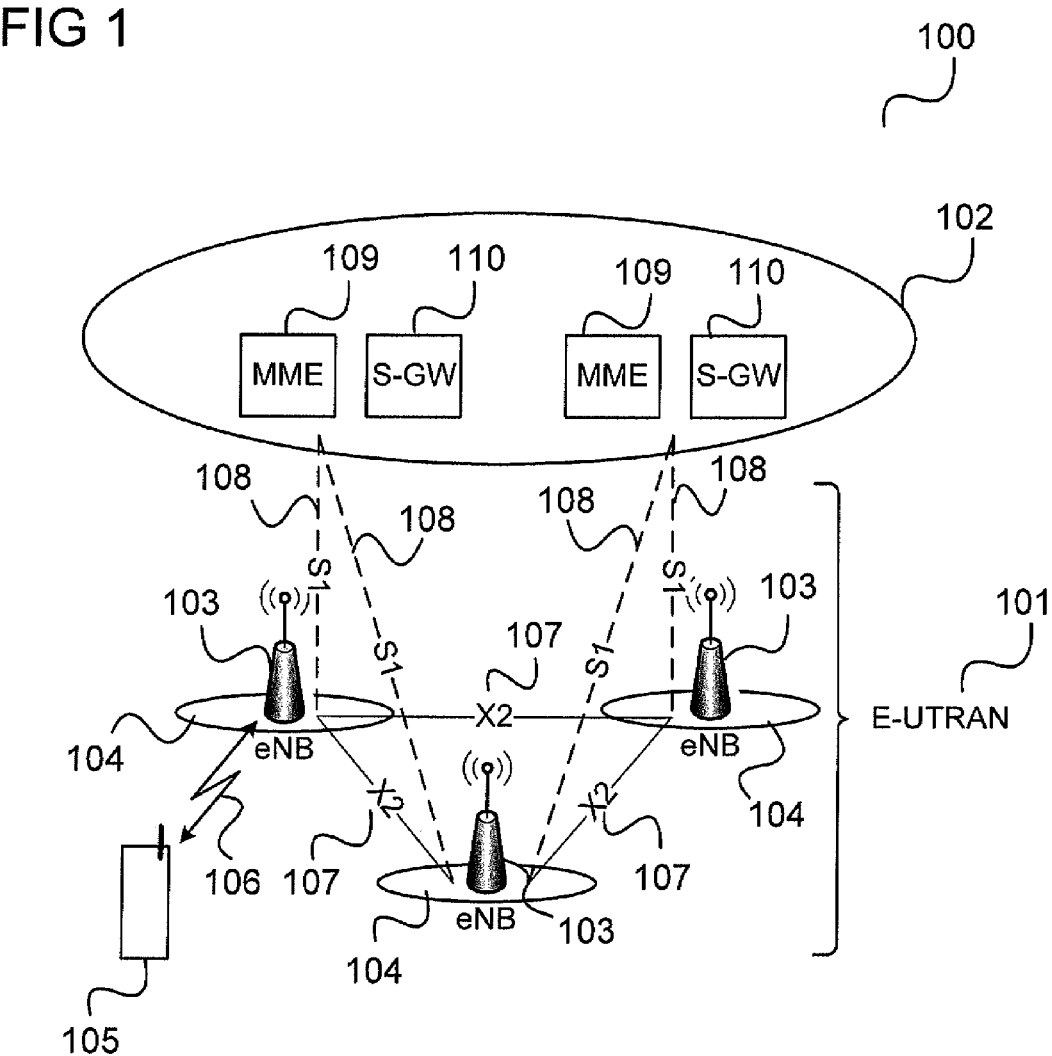
FIG. 1 shows a communication system according to an embodiment.

FIG. 1 shows a communication system 100 according to an embodiment.

According to this embodiment, the communication system 100 is configured in accordance with the network architecture of LTE.

The communication system includes a radio access network (E-UTRAN, Evolved UMTS Terrestrial Radio Access Network) 101 and a core network (EPC, Evolved Packet Core) 102. The E-UTRAN 101 may include base (transceiver) stations (eNodeBs, eNBs) 103. Each base station 103 provides radio coverage for one or more mobile radio cells 104 of the E-UTRAN 101.

A mobile terminal (UE, user equipment) 105 located in a mobile radio cell 104 may communicate with the core network 102 and with other mobile terminals 105 via the base station providing coverage (in other words operating) in the mobile radio cell.

Control and user data are transmitted between a base station 103 and a mobile terminal located in the mobile radio cell 104 operated by the base station 103 over the air interface 106 on the basis of a multiple access method.

The base stations 103 are interconnected with each other by means of the X2 interface 107. The base stations are also connected by means of the S1 interface 108 to the core network (Evolved Packet Core) 102, more specifically to a MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

In one embodiment, according to LTE, the communication system 100 supports the following types of duplexing methods: full-duplex FDD (frequency division duplexing), half-duplex FDD and TDD (time division duplexing). According to full-duplex FDD two separate frequency bands are used for uplink transmission (i.e. transmission from mobile terminal 105 to base station 103) and downlink transmission (i.e. transmission from base station 103 to mobile terminal 105) and both transmissions can occur simultaneously. According to half-duplex FDD also two separate frequency bands are used for uplink and downlink transmissions, but both transmissions are non-overlapping in time. According to TDD the same frequency band is used for transmission in both uplink and downlink. Within a time frame the direction of transmission may be switched alternatively between downlink and uplink.

Data transmission between the mobile terminal 105 and the corresponding base station 103 (i.e. the base station operating the radio cell in which the mobile terminal 105 is located) is carried out in accordance with a (radio) frame structure. An example for a frame structure, denoted as frame structure type 1, is shown in FIG. 2.

Figure 2:
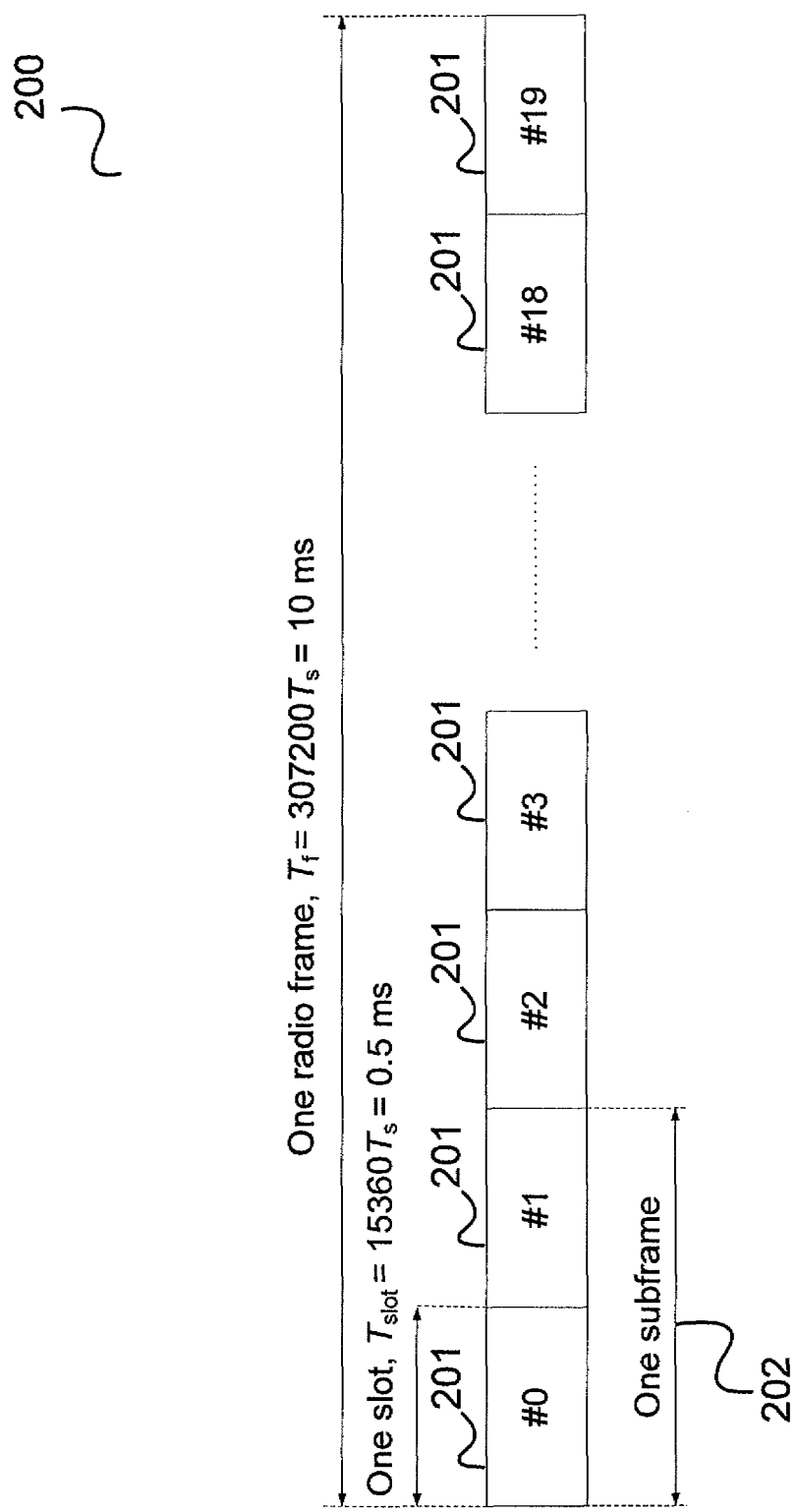
FIG. 2 shows a frame in accordance with an embodiment.

FIG. 2 shows a frame 200 in accordance with an embodiment.

The frame 200 may be used for both full-duplex and half-duplex FDD. The frame 200 is 10 ms long and consists of 20 slots 201 of length 0.5 ms, numbered from 0 to 19. A subframe 202 is defined as two consecutive slots 201. In each 10 ms interval 10 subframes 202 are available for downlink transmissions or uplink transmissions. Uplink and downlink transmissions are separated in the frequency domain. Depending on the slot format a subframe 202 may include 14 or 12 OFDMA (orthogonal frequency division multiple access) symbols in DL (downlink) and 14 or 12 SC-FDMA symbols in UL (uplink), respectively.

Further, in one embodiment, due to the TDMA component of the LTE multiple access schemes in UL and DL so-called timing advance (TA) adjustments for the uplink transmissions take place with the aim that a signal from a UE 105 arrives at the corresponding base (transceiver) station 103 according to the determined frame/subframe timing and does not interfere with the transmission of other UEs. A timing advance value corresponds to the length of time a UE 105 has to advance its timing of UL transmission and is sent by the eNodeB to the UE 105 according to the perceived propagation delay of UL transmissions.

According to one embodiment, according to LTE UL/DL and FDD mode, the following physical channels are specified:

PUSCH:
  Carries user and control data in uplink.
PDCCH:
  Uplink physical channel only, i.e. no logical and transport channels are mapped to this channel.
  Carries the control information such as HARQ (Hybrid automatic repeat request) ACK/NACKs (acknowledgements/negative acknowledgements) in response to downlink transmissions on PDSCH, scheduling requests and CQI (channel quality indication) reports.
PDSCH:
  Carries user and control data and paging messages in downlink.
  Occupies the OFDMA symbols in a subframe not occupied by PDCCH.
PDCCH:
  Downlink physical channel only, i.e. no logical and transport channels are mapped to this channel.
  Carries the control information related to DL/UL transmissions such as resource assignments and HARQ information.
  Occupies 1, 2, 3 or 4 OFDMA symbols in the first slot in a subframe. The number of symbols is adjusted by network and signalled on PCFICH.

PCFICH:
  Downlink physical channel.
  Informs the UE about the number of OFDM symbols used for the PDCCHs.
  Occupies the first OFDMA symbol in the first slot in a subframe.
  Is transmitted when the number of OFDM symbols for PDCCH is greater than zero.
PHICH:
  Downlink physical channel.
  Carries Hybrid ARQ ACK/NACKs in response to uplink transmissions.
  Occupies 1, 2, or 3 OFDMA symbols in the first slot in a subframe. The number of symbols is adjusted by network and signaled on P-BCH.
P-BCH:
  Carries system information to be broadcast in the cell such as DL bandwidth information and number of OFDMA symbols assigned to PHICH.

Further, according to LTE, two types of scheduling mechanisms are supported in one embodiment:
  Basically, dynamic scheduling is applied in UL/DL, i.e. the base station 103 dynamically allocates resources (physical resource blocks (PRB), modulation and coding scheme (MCS)) to a mobile terminal 105 via the UE-specific C-RNTI (cell radio network temporary identity) on PDCCH. The resources allocation is valid for the time period of one TTI (i.e. 1 ms) and is implicitly released after that period. The mobile terminal 105 monitors the PDCCH in order to find possible allocations.
  In addition, semi-persistent scheduling (SPS) can be applied in UL/DL if enabled by the base station 103 for reducing signaling overhead for periodic type of traffic with predictable packet arrival times and fixed (small or medium) payload size such as VoIP (Voice over Internet Protocol). In case of SPS, the base station 103 allocates SPS resources (pre-defined PRBs and MCS) for the first HARQ transmissions to the mobile terminal 105. SPS allocations are identified on PDCCH via the UE-specific SPS C-RNTI. The SPS resources can be implicitly reused in the following TTIs (time transmission intervals) according to a periodicity defined by the base station 103. Although SPS resources have been allocated, the mobile terminal 105 is required to monitor the PDCCH in the subframes where the mobile terminal 105 has been SPS allocated resources as the base station 103 can override the SPS allocation for that TTI.

Figure 3:
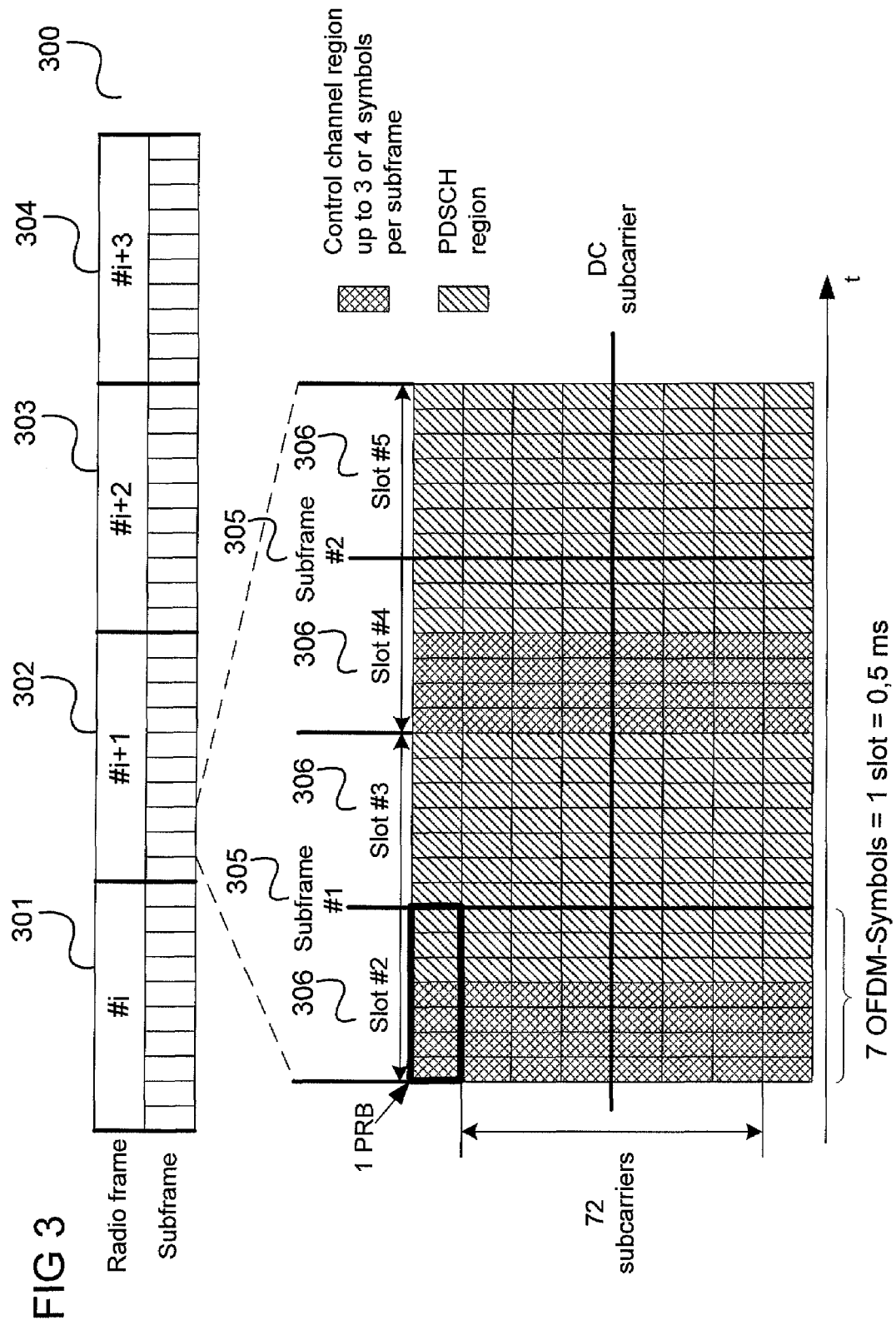
FIG. 3 shows an OFDM symbol allocation according to one embodiment.

The resource mapping of the physical channels PDCCH and PDSCH according to one embodiment is illustrated in FIG. 3.

FIG. 3 shows an OFDM symbol allocation according to one embodiment.

Four radio frames 301, 302, 303, 304 are shown in FIG. 3, each having the structure as explained above with reference to FIG. 2, i.e. each including 10 subframes 305 wherein each subframe 305 includes two slots 306.

In this embodiment, each slot may include 7 OFDM-symbols for each of 72 sub-carriers. The PDCCH carries the control information related to DL/UL transmissions such as resource assignments and HARQ information. The PDCCH occupies 1, 2, 3 or 4 OFDMA symbols in the first slot in a subframe. The number of symbols is adjusted by the radio access network 101 and signalled on the PCFICH.

The PDSCH carries user and control data and paging messages in downlink, and occupies the OFDMA symbols in a subframe not occupied by PDCCH.

As an example, the case that the PDCCH occupies 4 OFDMA symbols in the first slot of every subframe is illustrated in FIG. 3 by the hatching.

Figure 4:
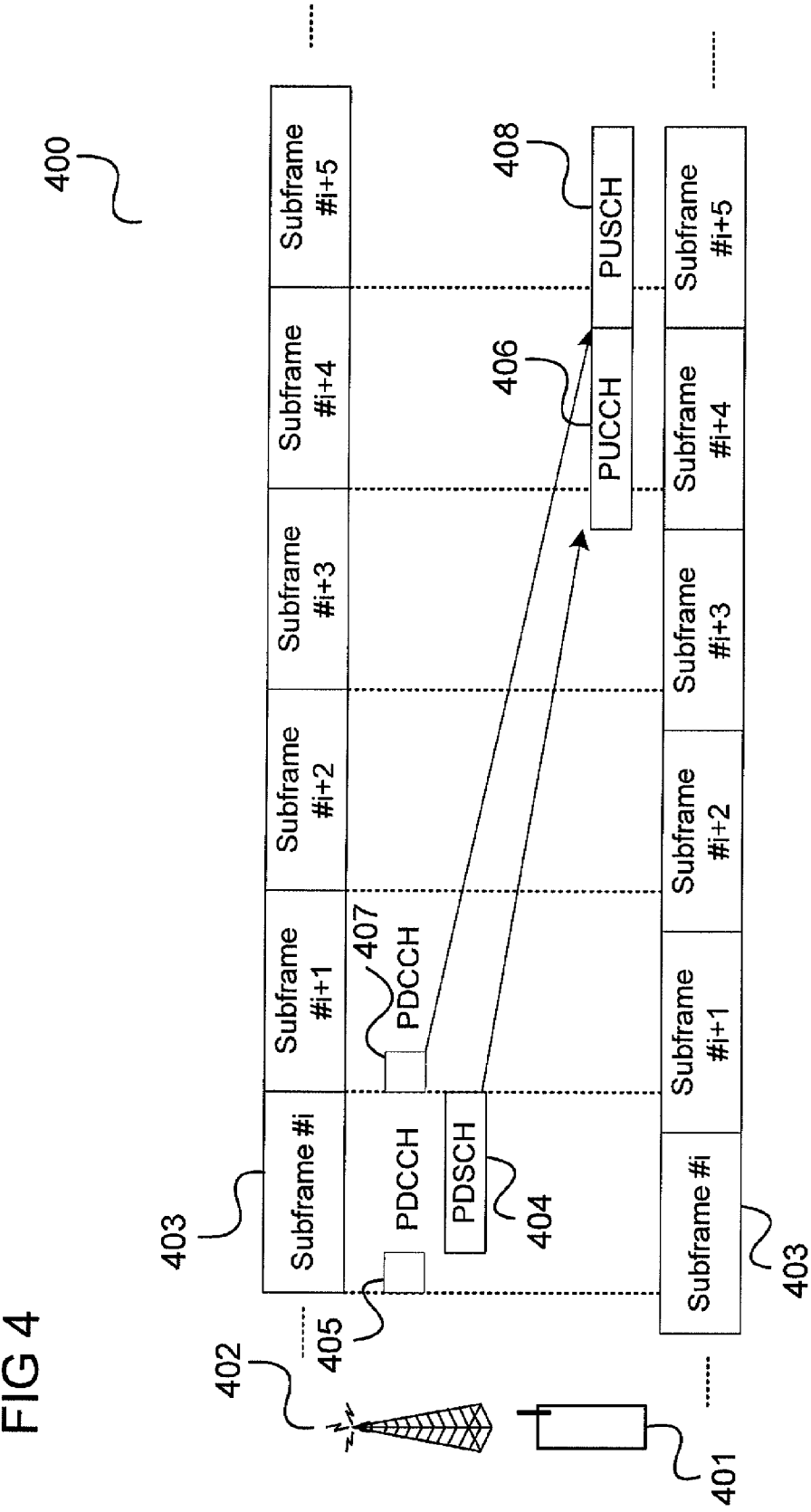
FIG. 4 shows a message flow diagram according to an embodiment.

In one embodiment, in FDD, the following UL-DL transmission timing relationship applies for FDD as illustrated in FIG. 4.

FIG. 4 shows a message flow diagram 400 according to an embodiment.

The message flow takes place between a mobile terminal 401 and a base station 402 as explained above with reference to FIG. 1.

The message flow is shown for a sequence of subframes 403 as described with reference to FIG. 2 which may have slightly different starting times for the mobile terminal 105 and the base station 103.

Upon detection of a PDSCH transmission 404 in subframe #i intended for the mobile terminal 105 (which is indicated by the preceding PDCCH transmission 405) and for which an HARQ ACK/NACK shall be provided, the mobile terminal 105 transmits an ACK/NACK response 406 in subframe #i+4, e.g. on PUCCH.

Upon detection of a PDCCH transmission with DCI (Downlink Control Information) format 0 (=UL grant) 407 in subframe #i+1 intended for the mobile terminal 105 (i.e. the mobile terminal 105 received an uplink resource allocation), the mobile terminal 105 adjusts the corresponding PUSCH transmission 408 in subframe #i+5 according to the PDCCH information of the PDCCH transmission 407.

A study is conducted in 3GPP for the further advancement of LTE towards an IMT (International Mobile Communications)-Advanced radio interface technology, referred to as LTE-Advanced. The IMT-Advanced activities have been commenced and are guided by ITU-R (International Telecommunications Union-Radiocommunication Sector). In line with user trends and technology developments the key objective of the IMT-Advanced activities is to develop mobile radio communication systems that include new capabilities that go beyond those of current IMT-2000 systems such as UMTS and CDMA2000 (CDMA: Code division multiple access). Key features to be supported by candidate IMT-Advanced systems have been set by ITU-R and include amongst others:

high quality mobile services;
worldwide roaming capability; and
peak data rates of 100 Mbps for high mobility environments and 1 Gbps for low mobility environments.

The current discussions in 3GPP related to LTE-Advanced are focused on the technologies to further evolve LTE in terms of spectral efficiency, cell edge throughput, coverage and latency based on the agreed requirements. Candidate technologies include multi-hop Relay, UL MIMO (multiple input multiple output) with up to (4×4) antennas, DL MIMO with up to (8×8) antennas, Coordinated Multipoint Transmission/Reception (CoMP), support of bandwidths >20 MHz and up to 100 MHz by spectrum aggregation, flexible spectrum usage/spectrum sharing, and inter-cell interference management.

One of the key characteristics of LTE-Advanced is the support of bandwidths >20 MHz and up to 100 MHz by spectrum aggregation, i.e. the bandwidth of an LTE-Advanced (LTE-A) radio cell will be composed of a number of so-called component carriers (CC), in where the bandwidth size of each component carrier is limited to a maximum of 20 MHz. The component carriers may be adjacent or non-adjacent, and in FDD mode asymmetric allocation of DL and UL component carriers is considered, i.e. different number of component carriers of different bandwidths in UL and DL. An LTE-A UE may simultaneously receive or transmit on one or multiple component carriers depending on its RF capabilities. But due to technical constraints the RF TX/RX (radio frequency transmitting/receiving) capability of LTE-A UEs is expected to be <100 MHz, very probably ≤60 or 40 MHz. Further, there may be LTE-A UEs which are equipped only with a single transceiver.

As consequence of these limitations, an LTE-A UE may typically need a certain time to switch the transmission and reception entities to another component carrier, that is outside the supported bandwidth. During this switching time, no reception and transmission will be possible. The switching time is UE implementation dependent. For instance, an exemplary value of such switching time can be in range of 120 μs which corresponds to approximately two OFDMA symbols in LTE.

Further, an LTE-A radio cell is required to be backward compatible to Release 8 (Rel-8) LTE UEs with RF TX/RX capability of 20 MHz, i.e. at least one of the component carriers needs to be configured/operated Rel-8 LTE-compliantly.

Figure 5:
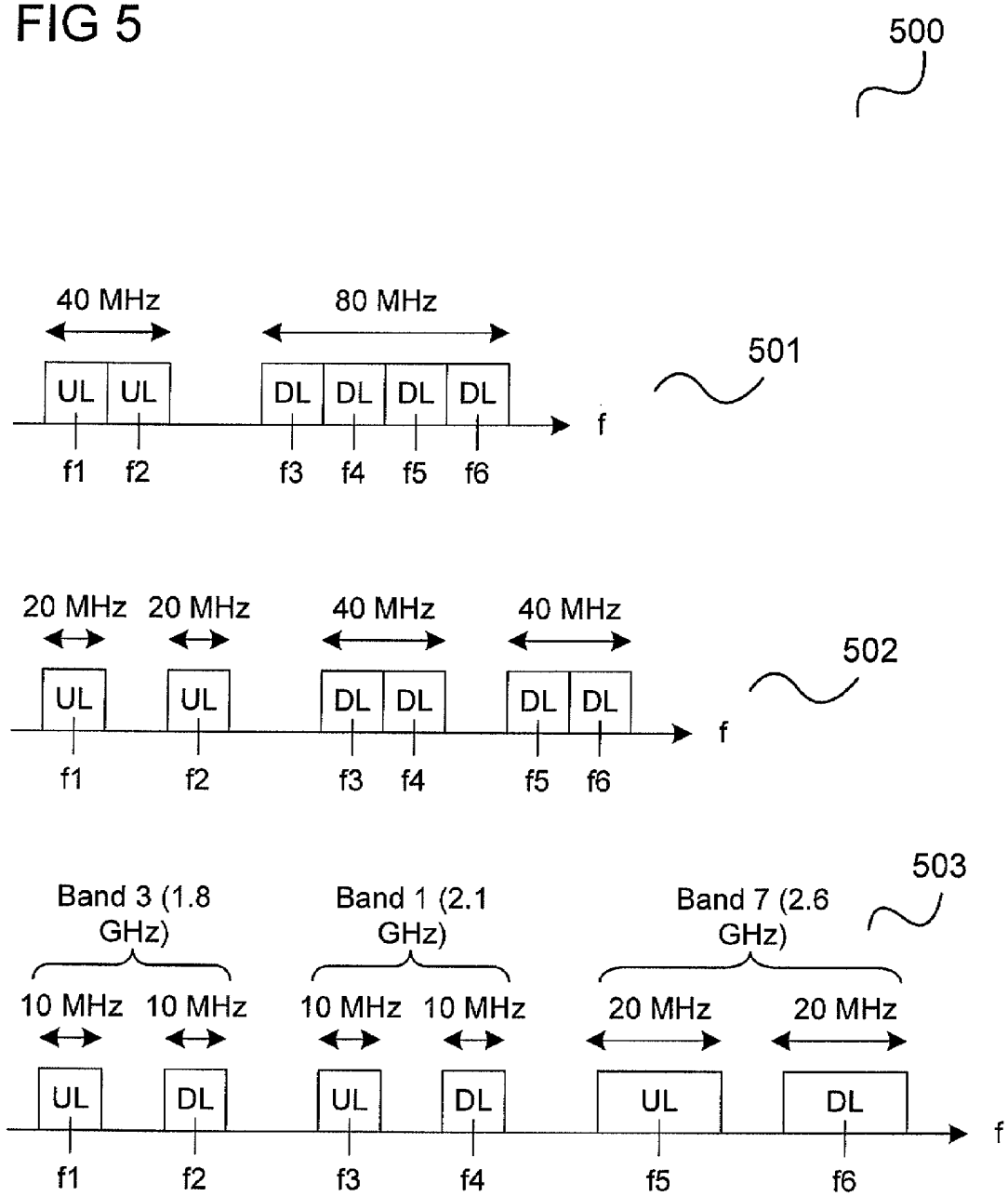
FIG. 5 shows frequency allocation diagrams.

Exemplary RF deployment scenarios according to one embodiment, in accordance with LTE-A operating in FDD mode, are illustrated in FIG. 5.

FIG. 5 shows frequency allocation diagrams 501, 502, 503.

A first frequency allocation diagram 501 shows a first scenario being a single band, contiguous and asymmetric RF deployment scenario in UL/DL, wherein the bandwidth size of each component carrier is 20 MHz. The UL is composed of two adjacent component carriers characterized by the carrier frequencies f1 and f2 (i.e. 40 MHz UL contiguous). The DL is composed of four adjacent component carriers characterized by the carrier frequencies f3 to f6 (i.e. 80 MHz DL contiguous).

Analogously, a second frequency allocation diagram 502 illustrates a second scenario being a Single band scenario with 80 MHz DL (non-contiguous) and 40 MHz UL (non-contiguous).

A third frequency allocation diagram 503 illustrates a third scenario being a multi band scenario with 40 MHz in UL and DL (non-contiguous).

The "flexible multi-carrier" characteristic of LTE-A in terms of variable number and position of component carriers and the limited RF TX/RX capability of LTE-A UEs leads to new issues of LTE-A networks and LTE-A-UEs which requires new configuration options and signaling e.g. for resource allocation.

The current status of discussions in 3GPP with regard to the configuration of component carriers and scheduling in terms of resource assignment is as follows.

Among all UL/DL component carriers available in the LTE-A radio cell the LTE-A UE is configured (e.g. at connection setup via an RRC, radio resource control, message and may be re-configured during the connection) with a set of DL and UL component carriers on which the UE may be scheduled to receive the PDSCH in DL and the PUSCH in UL, respectively. These sets of component carriers are referred to as "UE DL CC set" and "UE UL CC set".

Two options may be used for downlink scheduling. This is illustrated in FIG. 6.

Figure 6:
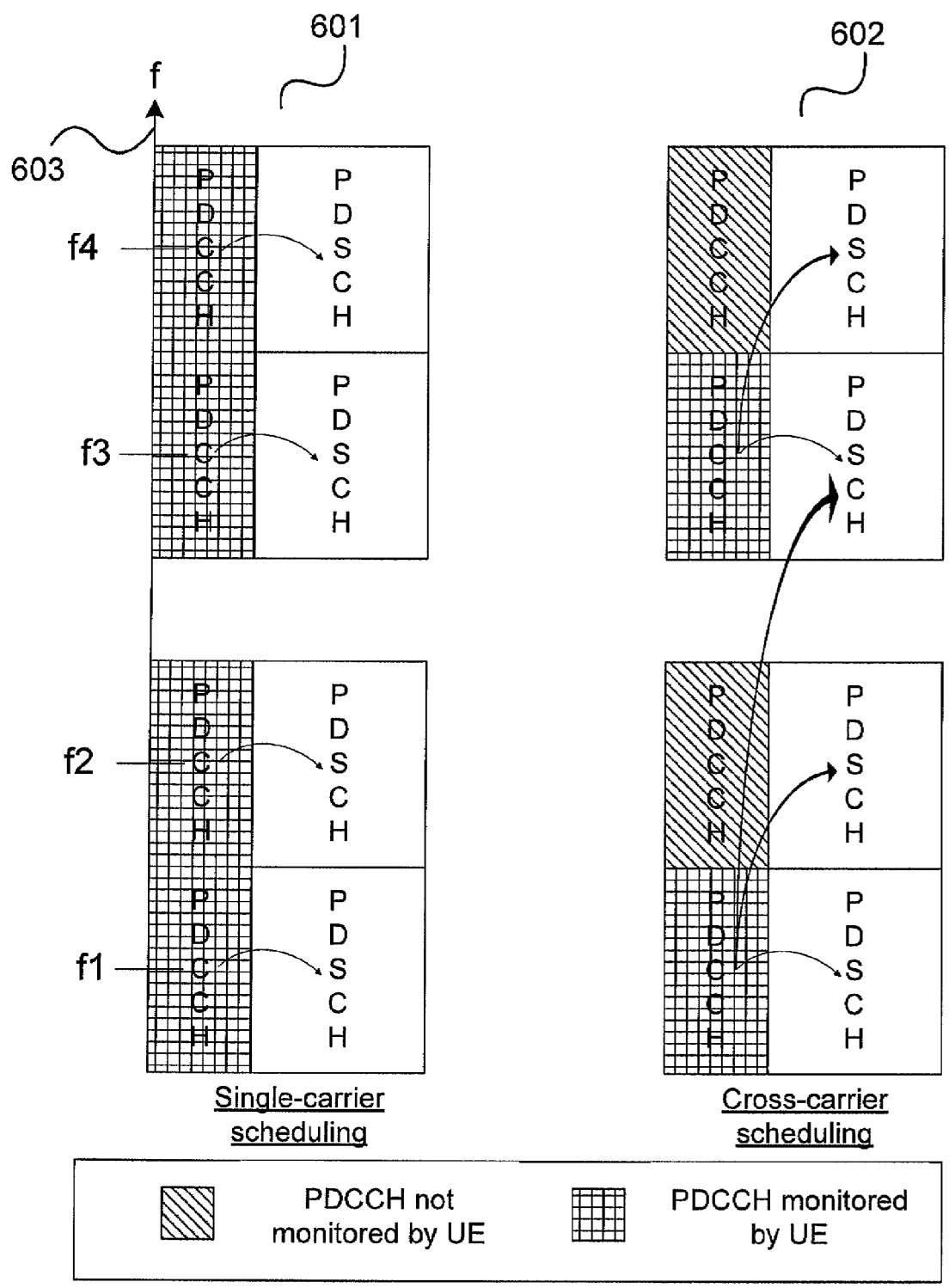
FIG. 6 illustrates downlink scheduling according to an embodiment in a first diagram and a second diagram.

FIG. 6 illustrates downlink scheduling according to an embodiment in a first diagram 601 and a second diagram 602.

The first diagram 601 illustrates single carrier scheduling. The mobile terminal 105 is required to monitor the PDCCH on all component carriers (indicated by center frequencies f1, f2, f3, f4 along frequency axis 603) as configured by the UL DL CC (uplink downlink component carrier) set, and PDSCH resources can only be assigned for the same component carrier as used for the PDCCH signalling the assignment. This option is compliant to LTE.

The second diagram 602 illustrates cross carrier scheduling. The mobile terminal 105 is required to monitor the PDCCH on a smaller set of component carriers compared to single carrier scheduling (as indicated by the hatching). This is configured by the UL DL CC set. With a PDCCH received on a certain component carrier PDSCH resources on a different component carrier can be assigned. According to LTE-A, this can be achieved by the parameter "Carrier Indicator Field" (CIF). The main benefit of cross carrier scheduling compared to single carrier scheduling is the reduction of UE decoding complexity, e.g. the number of monitored PDCCHs can be reduced.

According to one embodiment, a solution for scheduling is provided considering the limited RF TX/RX capabilities of an LTE-A mobile terminal, especially for the case of cross carrier scheduling to avoid loss of data during the switching time of the UE transceiver in case of an assignment of PDSCH resources on a component carrier that are located outside the supported bandwidth, i.e. for which the transceiver of the mobile terminal has to be re-tuned to a different frequency region.

In one embodiment, a solution for cross carrier scheduling is proposed, i.e. a solution to assign resources to a mobile terminal whereas the resources are located at a different frequency range than the frequency range used to signal the resource assignment. According to one embodiment, this solution takes into account the capability of the mobile terminals to switch the receiver and/or the transmitter to the new frequency range.

In other words, in one embodiment, a way is provided to enable the LTE-A base station and the LTE-A-UE to change the component carrier during an ongoing connection while considering the limited RF TX/RX capabilities of LTE-A UEs.

Communication devices according to various embodiments are described in the following.

Figure 7:
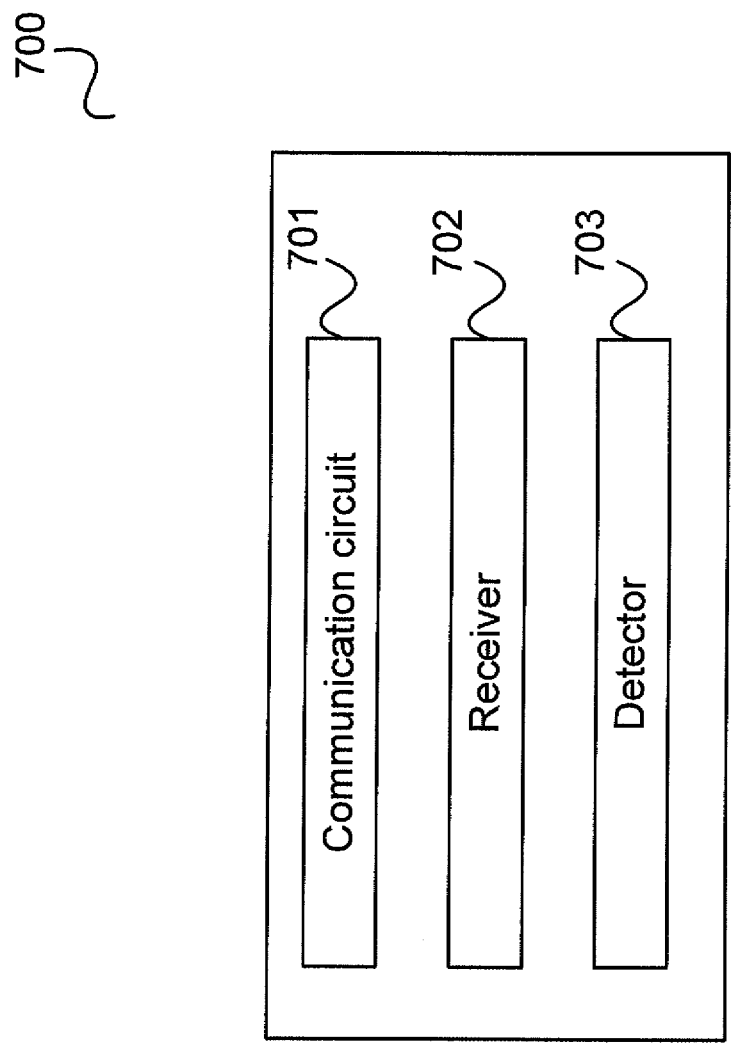
FIG. 7 shows a communication device according to an embodiment.

FIG. 7 shows a communication device 700 according to various embodiments.

The communication device 700 includes a communication circuit 701 configured to communicate in a first communication mode using a first frequency range.

The communication device 700 further includes a receiver 702 configured to receive a switching delay information message indicating a time interval by which start of communication in a second communication mode using a second frequency range should be delayed after a switch from the first communication mode to the second communication mode and a detector 703 configured to detect whether the time interval has elapsed since the start of the switching from the first communication mode to the second communication mode if the communication circuit has started switching from the first communication mode to the second communication mode.

The communication circuit 701 is configured to communicate in the second communication mode when the time interval has elapsed since the start of the switching from the first communication mode to the second communication mode.

In other words, the communication device receives an indication how long the pause of communication after the start of switching of communication modes is, e.g. after what time interval the communication device should start sending or receiving data in the second communication mode. The time interval may be seen as the time given to the communication device to perform its switching operation.

The communication device 700 is for example a mobile terminal of a mobile communication system.

The switching delay information message is for example received from a base station of the mobile communication system.

In one embodiment, in the first communication mode, the communication circuit 701 communicates using a plurality of sub-carriers having frequencies in the first frequency range and wherein in the second communication mode, the communication circuit communicates using a plurality of sub-carriers having frequencies in the second frequency range.

For example, in the first communication mode, the communication circuit 701 communicates according to OFDM using the first frequency range and in the second communication mode, the communication circuit communicates according to OFDM using the second frequency range.

For example, in the first communication mode, the communication circuit 701 communicates using a first LTE-A component carrier and in the second communication mode, the communication circuit communicates using a second LTE-A component carrier.

In one embodiment, the communication circuit 701 is configured to re-tune from the first frequency range to the second frequency range for a switch from the first communication mode to the second communication mode. In other words, the communication circuit is set (or switched) from the first communication mode to the second communication mode. This may for example require the resetting of a sender/receiver to a new frequency range, e.g. a new center frequency.

The switching delay information message is for example received in the first communication mode.

The communication device 700 may further include a sending circuit configured to send a required switching time information message specifying a required switching time interval required by the communication circuit to switch from the first communication mode to the second communication mode.

In one embodiment, the receiver 702 is configured to receive a switching request message indicating that the second communication mode is to be used for communicating and wherein the communication circuit is configured to start switching from the first communication mode to the second communication mode in reaction to receiving the switching request message.

The switching request message is for example a scheduling message specifying that the communication device 700 may communicate in the second communication mode for a predefined transmission time. For example, the switching request message specifies one or more resource blocks or resource elements allocated to the communication device.

The communication circuit 701 may for example be configured to receive data in the first communication mode using the first frequency range and in the second communication mode using the second frequency range. For example, the communication using the first frequency range and the second frequency range may be a downlink communication in a mobile communication system.

In one embodiment, the communication device 700 is a mobile terminal of a mobile communication system, the delay information message is received from a base station of the mobile communication system and the communication circuit is configured to receive data from the base station in the first communication mode and in the second communication mode.

The communication device of FIG. 7, e.g. a mobile terminal, may for example communicate with a communication device described in the following with reference to FIG. 8, e.g. a base station.

Figure 8:
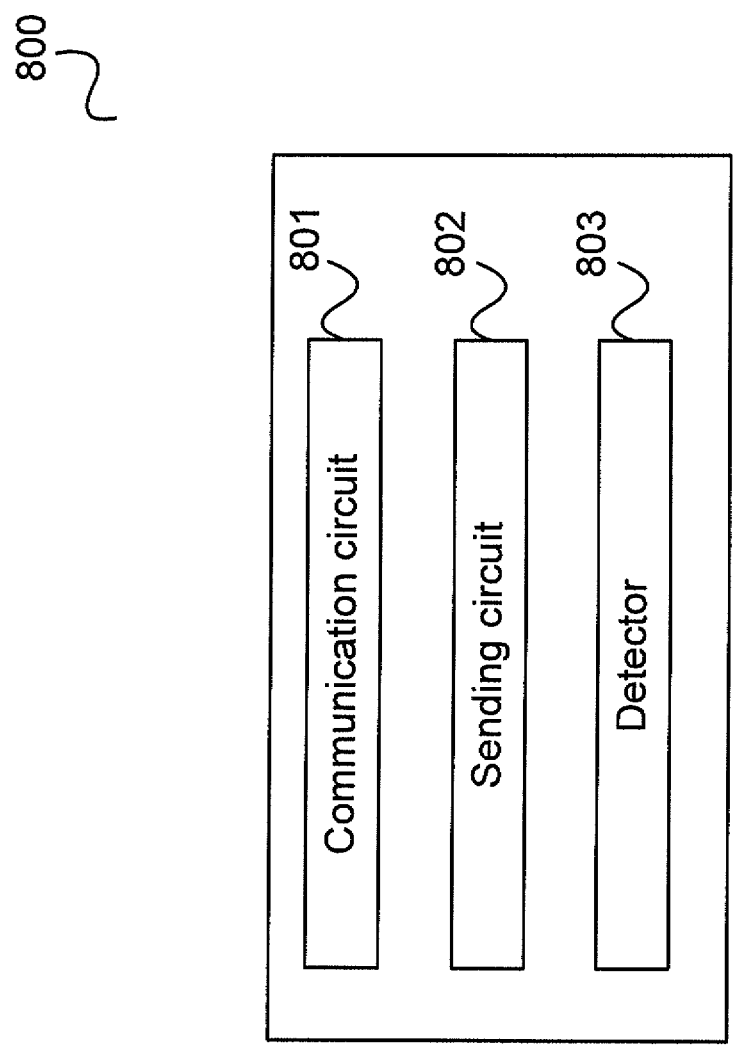
FIG. 8 shows a communication device according to an embodiment.

FIG. 8 shows a communication device 800 according to various embodiments.

The communication device 800 may include a communication circuit 801 configured to communicate in a first communication mode using a first frequency range and a sending circuit 802 configured to send a switching delay information message to another communication device indicating a time interval by which start of communication in a second communication mode using a second frequency range should be delayed after a switch from the first communication mode to the second communication mode.

The communication device 800 may further include a detector 803 configured to detect whether the time interval has elapsed since the start of the switching from the first communication mode to the second communication mode if the communication circuit has started switching from the first communication mode to the second communication mode, wherein the communication circuit 801 is configured to communicate in the second communication mode when the time interval has elapsed since the start of the switching from the first communication mode to the second communication mode.

The communication device 800 is for example a base station of a mobile communication system, e.g. a cellular mobile communications system, for example according to LTE Advanced. Accordingly, the other communication device may be a mobile terminal of the mobile communication system.

The communication device 800 may further include a receiver configured to receive a required switching time message from the other communication device specifying a required switching time interval required by the communication circuit to switch from the first communication mode to the second communication mode.

In one embodiment, the communication device 800 may include a determining circuit configured to determine the time interval based on the required switching time interval. For example, the determining circuit may be configured to determine the time interval such that it is at least as long as the required switching time interval.

In one embodiment, the sending circuit 802 is configured to send a switching request message indicating that the second communication mode is to be used for communicating and wherein the communication circuit is configured to start switching from the first communication mode to the second communication mode after sending the switching request message.

The switching request message is for example sent in the first communication mode.

The switching request message may be a scheduling message specifying that the other communication device may communicate in the second communication mode for a pre-defined transmission time.

The communication circuit 801 is for example configured to send data to the other communication device in the first communication mode using the first frequency range and in the second communication mode using the second frequency range.

In one embodiment, the communication device 800 is a base station of a mobile communication system, the delay information message is sent to a mobile terminal of the mobile communication system and the communication circuit 801 is configured to send data to the mobile terminal in the first communication mode and in the second communication mode.

According to one embodiment, a delay time is indicated towards a mobile terminal that should be applied by the mobile terminal when cross carrier scheduling takes place for the mobile terminal. This delay time may be selected by the base station or the core network and takes into account the time needed by the mobile terminal to tune the transmitter and receiver to another component carrier.

According to one embodiment, the following is carried out:
1. The mobile terminal (e.g. a UE according to LTE-A) indicates its cross carrier scheduling capabilities towards the radio access network (e.g. the UTRAN). Included in this indication are at least an identification of the mobile terminal (e.g. an ID in accordance with UMTS) and the time needed by the mobile terminal to tune its transmitter and/or receiver from one component carrier to another component carrier (denoted $T_R$ in the embodiments described below). This indication may be optional.
2. The radio access network indicates to the mobile terminal what switching delays (denoted $T_S$ in the embodiments described below) are configured.
3. The network commands the mobile terminal to perform the cross carrier switching. This command includes an identification which scheduling details indicated in 2 are applicable for this cross carrier scheduling.

This embodiment allows changing the component carrier during an ongoing connection while it avoids loss of data caused by the incompetence of an UE to transmit or receive data during re-tuning period. Furthermore, it requires very little changes of the resource assignment signaling as only a simple identification is added that indicates which scheduling parameters should be used. Additionally, it allows different scheduling configurations for different UEs.

According to one embodiment no additional signaling over the air is required.

According to one embodiment, a mobile terminal and the radio access network are enabled to use resources that cannot be used during cross carrier scheduling by the switching mobile terminal. According to this embodiment, an allocation period $T_A$ is signalled when allocating the resource, i.e. this parameter is included in a resource allocation message. When the period expires, the resource is no more allocated to the mobile terminal and will be used by the switching mobile terminal that has just participated in the cross carrier scheduling. This may allow saving radio resources.

A communication device 900 according to another embodiment is described in the following with reference to FIG. 9.

Figure 9:
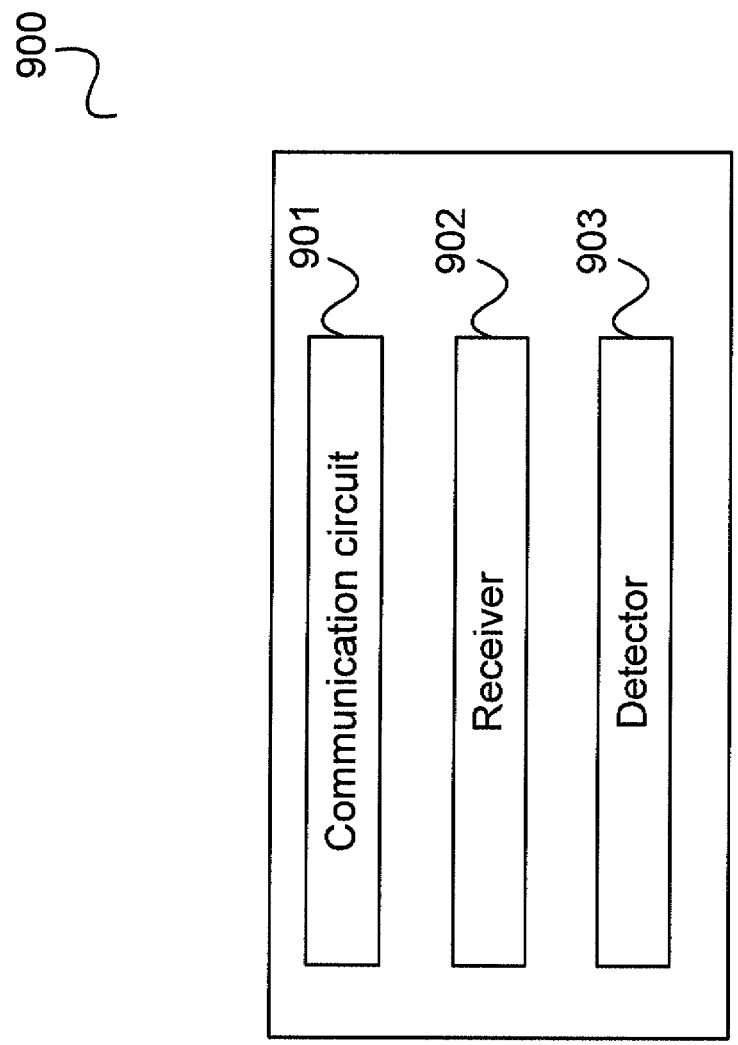
FIG. 9 shows a communication device according to an embodiment.

FIG. 9 shows a communication device 900 according to various embodiments.

The communication device 900 may include a communication circuit 901 configured to communicate in a first communication mode using a first frequency range and a receiver 902 configured to receive a switching request message indicating that a second communication mode using a second frequency range is to be used for communicating, wherein the communication circuit is configured to start switching from the first communication mode to the second communication mode in reaction to receiving the switching request message.

The communication device 900 may further include a detector configured to detect whether a pre-defined time interval has elapsed since the start of the switching from the first communication mode to the second communication mode, wherein the communication circuit 901 may be configured to communicate in the second communication mode when the pre-defined time interval has elapsed since the start of the switching from the first communication mode to the second communication mode.

The communication device 900 is for example a mobile terminal of a mobile communication system.

In one embodiment, the switching request message is received from a base station of the mobile communication system.

For example, the switching request message is received in the first communication mode.

The receiver 902 may further be configured to receive a switching delay information message including a specification of the pre-defined time interval.

In one embodiment, the communication circuit 901 is configured to receive data in the first communication mode using the first frequency range and in the second communication mode using the second frequency range.

The communication device 900 is for example a mobile terminal of a mobile communication system, the switching request message is received from a base station of the mobile communication system and the communication circuit is configured to receive data from the base station in the first communication mode and in the second communication mode.

The communication device of FIG. 9, e.g. a mobile terminal, may for example communicate with a communication device described in the following with reference to FIG. 10, e.g. a base station.

Figure 10:
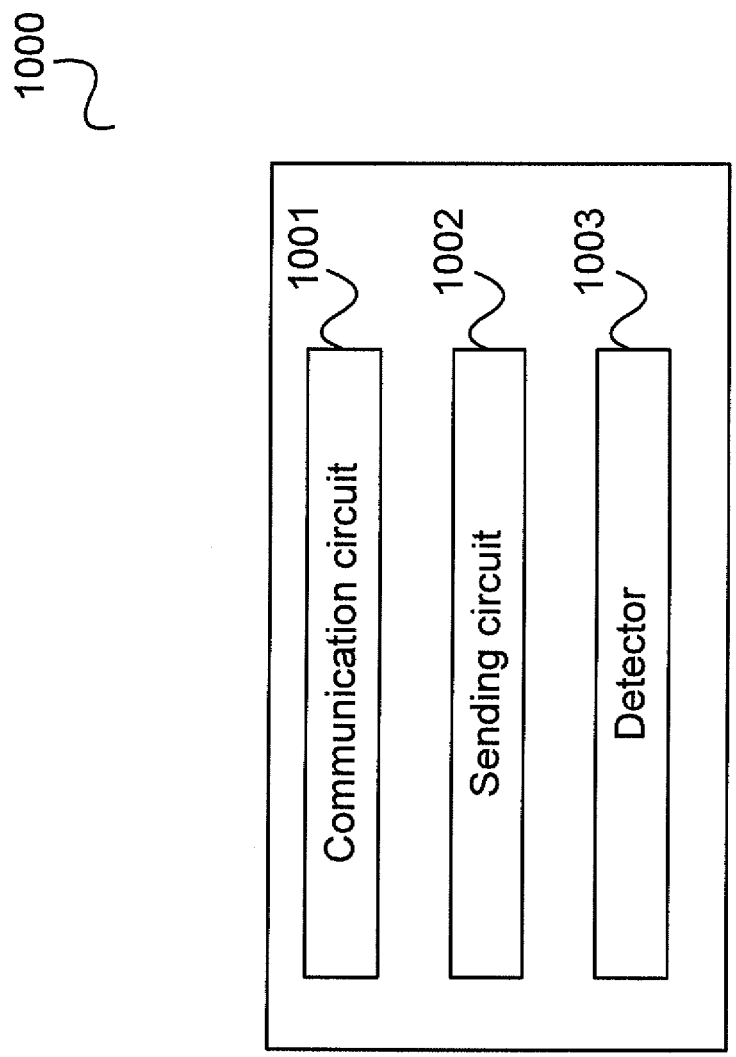
FIG. 10 shows a communication device according to an embodiment.

FIG. 10 shows a communication device 1000 according to various embodiments.

The communication device 1000 may include a communication circuit 1001 configured to communicate in a first communication mode using a first frequency range and a sending circuit 1002 configured to send a switching request message to another communication device indicating that a second communication mode using a second frequency range is to be used for communicating by the other communication device.

The communication device 1000 may further include a detector 1003 configured to detect whether a pre-defined time interval has elapsed since the sending of the switching request message, wherein the communication circuit 1001 is configured to communicate in the second communication mode when the pre-defined time interval has elapsed since the sending of the switching request message.

The communication device 1000 is for example a base station of a mobile communication system.

The other communication device may for example be a mobile terminal of the mobile communication system.

In one embodiment, the switching request message is sent in the first communication mode.

The sending circuit may further be configured to send a switching delay information message including a specification of the pre-defined time interval.

In one embodiment, the communication circuit 1001 is configured to send data in the first communication mode to the other communication device using the first frequency range and in the second communication mode using the second frequency range.

The communication devices 700, 800, 900, 1000 may include a memory which is for example used in the processing carried out by the communication devices 700, 800, 900, 1000. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

It should be noted that embodiments described in the context of one of the communication devices 700, 800, 900, 1000 are analogously valid for the other communication devices 700, 800, 900, 1000. Furthermore, the features of the communication devices 700, 800, 900, 1000 may be combined or partially combined into a communication device. Furthermore, methods for data transmission corresponding to the operation of the communication devices 700, 800, 900, 1000 may be provided according to other embodiments. Additionally, computer programs which when carried out by a computer make the computer perform such methods may be provided according to other embodiments.

The communication device is for example a mobile terminal of a mobile communication system, the delay information message is received from a base station of the mobile communication system and the communication circuit is configured to receive data from the base station in the first communication mode and in the second communication mode.

In the following, embodiments are described (without loss of generality) based on the communication system 100 described with reference to FIG. 1 having the following configuration:

The communication system 100 is an LTE-Advanced network based on OFDMA/TDMA in downlink, SC-FDMA/TDMA in uplink, and operating in FDD mode.

At least two component carriers are configured for the downlink that are useable by the mobile terminal 105 to receive a PDSCH. Each carrier uses the same number of OFDM-Symbols for the control channel region (PCFICH, PHICH and PDCCH, see FIG. 3).

These assumptions are made to show examples. It should be noted that embodiments are also applicable to other radio communication systems offering cross carrier scheduling and also for LTE TDD mode. It should for example be noted that for example the embodiment described with reference to FIG. 16 below is well suited to be applied for LTE TDD mode.

Embodiments are described based on resource allocation for the downlink, i.e. for the PDSCH. Nevertheless same principles are applicable for resource allocation for the uplink (i.e. for the PUSCH).

For illustration, the possibility of a loss of data for such a configuration is first described with reference to FIG. 11.

Figure 11:
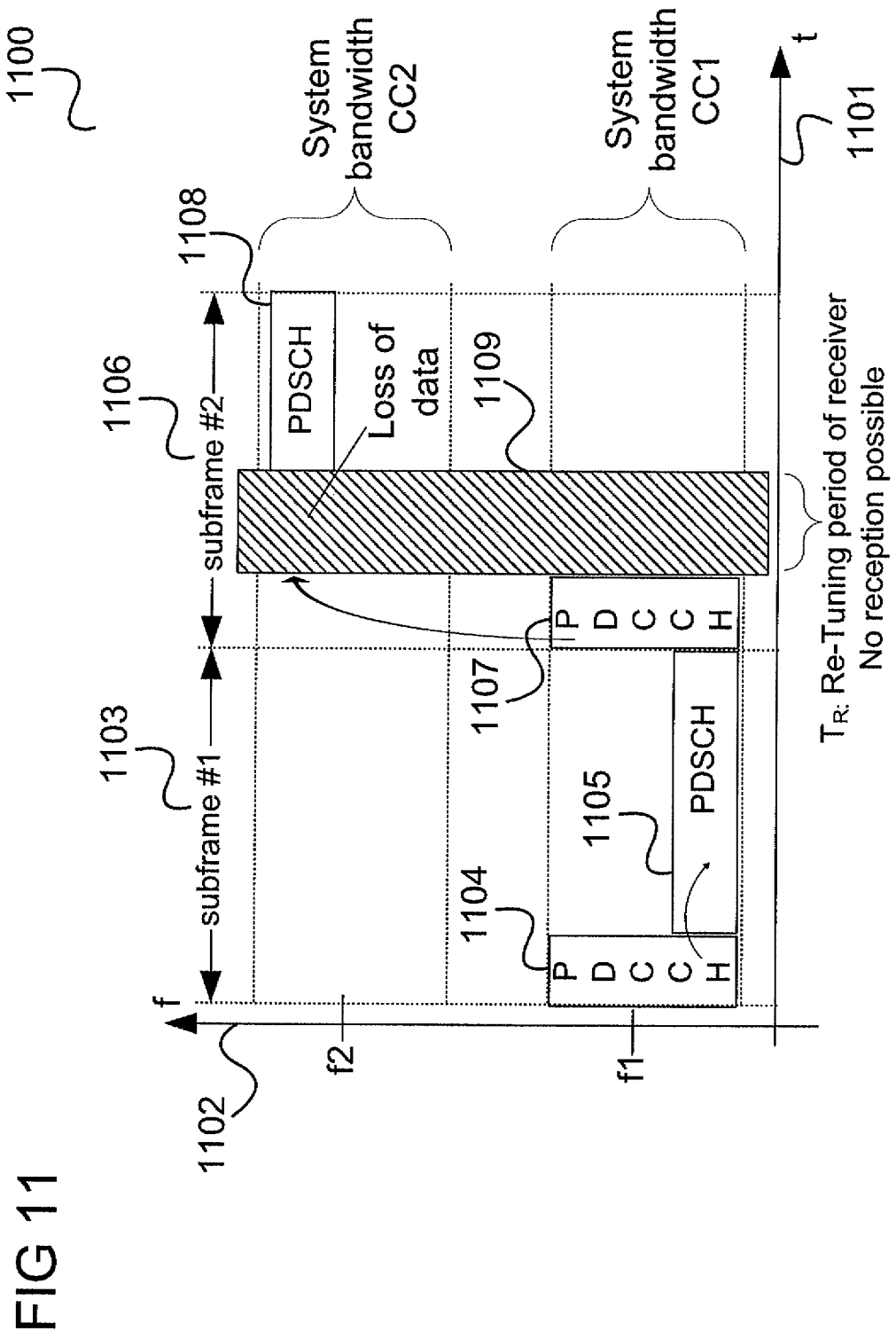
FIG. 11 shows a time-frequency diagram.

FIG. 11 shows a time-frequency diagram 1100.

Time increases into the direction of a first axis 1101 (t-axis) and frequency increases into the direction of a second axis 1102. The scenario shown may include two component carriers indicated by their center frequencies f1 (component carrier CC1) and f2 (component carrier CC2). In this example f2 is higher than f1 but the opposite case is also possible (this is also true for the embodiments described in the following).

In a first subframe 1103 the mobile terminal 105 receives a first scheduling message 1104 which indicates the component carrier CC1 for the following PDSCH transmission 1105.

In a second subframe 1106 the mobile terminal 105 receives a second scheduling message 1107 which indicates component carrier CC2 for the following PDSCH transmission 1108. The mobile terminal 105 requires the time $T_R$ for re-tuning its receiver from component carrier CC1 to component carrier CC2. During this time, the mobile terminal 105 cannot receive. Data of the second PDSCH transmission 1108 is lost as indicated by hatched block 1109.

Embodiments which allow avoiding such a data loss are described in the following.

Figure 12:
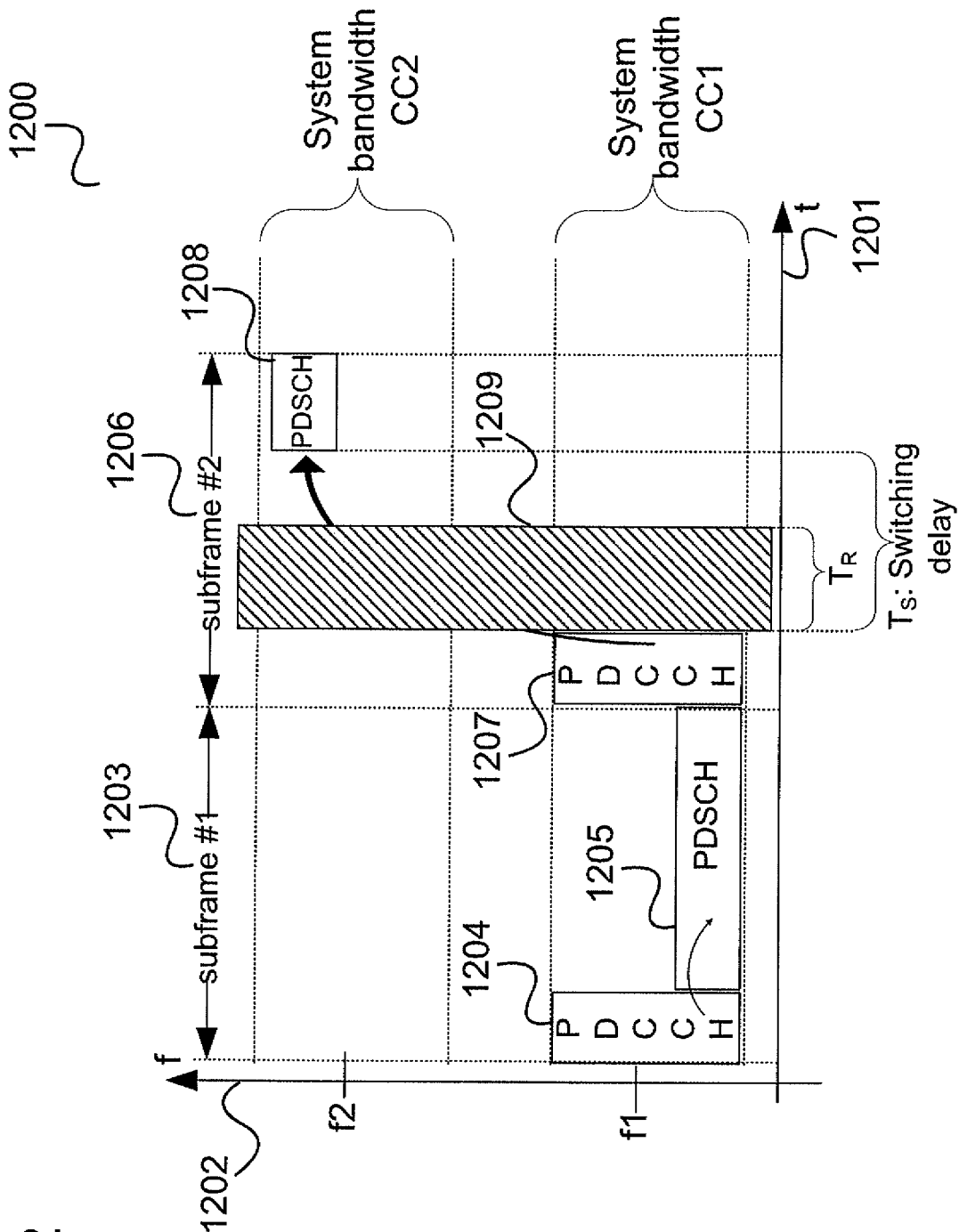
FIG. 12 shows a time-frequency diagram.

FIG. 12 shows a time-frequency diagram 1200.

The situation is similar to the one in FIG. 11, i.e. time increases into the direction of a first axis 1201 (t-axis) and frequency increases into the direction of a second axis 1202. There are two component carriers indicated by their center frequencies f1 (component carrier CC1) and f2 (component carrier CC2).

The base station 103 and the mobile terminal 105 have an ongoing communication connection.

In a first subframe 1203 the mobile terminal 105 receives a first scheduling message 1204 from the base station 105 which indicates the component carrier CC1 for the following PDSCH transmission 1205.

The base station 103 decides to schedule the mobile terminal 105 to another component carrier. Therefore it transmits, in a second subframe 1206 a second scheduling message (resource allocation message) 1207 on the PDCCH to the mobile terminal 105 which allocates a resource of another component carrier than the one currently used, namely CC2 instead of CC1. The second scheduling message 1207 for example includes an identification of the component carrier CC2 and the frequency position of allocated resources.

The mobile terminal 105 requires the time TR for re-tuning its receiver from component carrier CC1 to component carrier CC2. During this time, the mobile terminal 105 cannot receive. Data transmitted in this period would be lost as indicated by hatched block 1209.

However, in this embodiment the base station 103 and the mobile terminal 105 are pre-configured with a cross-carrier scheduling delay value $T_S$. The value is a for example given as a multiple of an OFDM symbol duration. This parameter is stored in the base station 103 and in the mobile terminal 105.

The mobile terminal 105 reads the second scheduling message 1207 on the PDCCH, tunes its receiver to the newly allocated component carrier CC2 and starts receiving data from the newly allocated resource after expiration of period $T_S$. $T_S$ is taken from an internal storage of the mobile terminal 105.

This allows cross carrier scheduling with minimal effort, no loss of data and with no need for additional signaling especially with no signaling over the air interface.

According to another embodiment, base station 103 is pre-configured with a cross-carrier scheduling delay value $T_S$. The value is for example a multiple of an OFDM-Symbol duration. This new parameter is broadcast in the radio cell 104 operated by the base station 103 within the system information.

The mobile terminal 105 receives this parameter $T_S$ when it reads the system information. It stores the parameter to be used in case that it receives a resource allocation for another carrier. Similar to the scenario shown in FIG. 12, the base station 103 has an ongoing connection with the mobile terminal 105 and decides to schedule the mobile terminal 105 to another component carrier (e.g., as in FIG. 12, from component carrier CC1 to component carrier CC2). Therefore it transmits a resource allocation message on the PDCCH to the mobile terminal 105 which allocates a resource from another component carrier (namely CC2) than the one currently used (namely CC1). This message for example includes an identification of the component carrier CC2 and the frequency position of allocated resources.

The mobile terminal 105 reads the message on the PDCCH, tunes its receiver to the newly allocated component carrier and starts receiving data from the newly allocated resource after expiration of period $T_S$. $T_S$ is taken from an internal storage of the mobile terminal 105. The timing of the cross carrier scheduling is similar as explained with reference to FIG. 12.

This approach allows cross carrier scheduling with less effort, especially with less additional signaling over the air interface. The operator of the communication system 100 may change the configuration in each radio cell 104 individually by changing the broadcast values.

Another embodiment is described in the following with reference to FIGS. 13 and 14.

Figure 13:
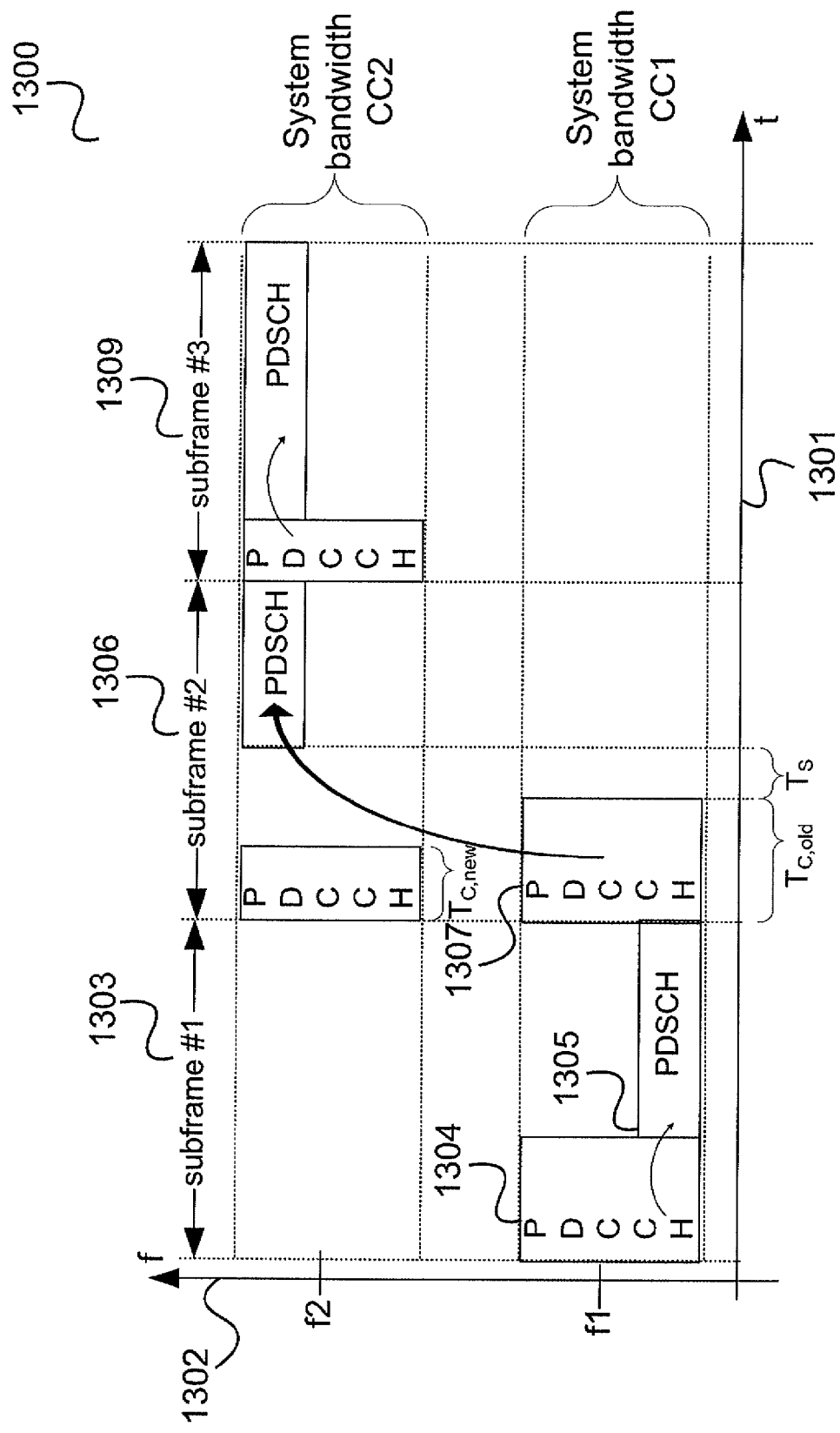
FIGS. 13 and 14 show time-frequency diagrams.
Figure 14:
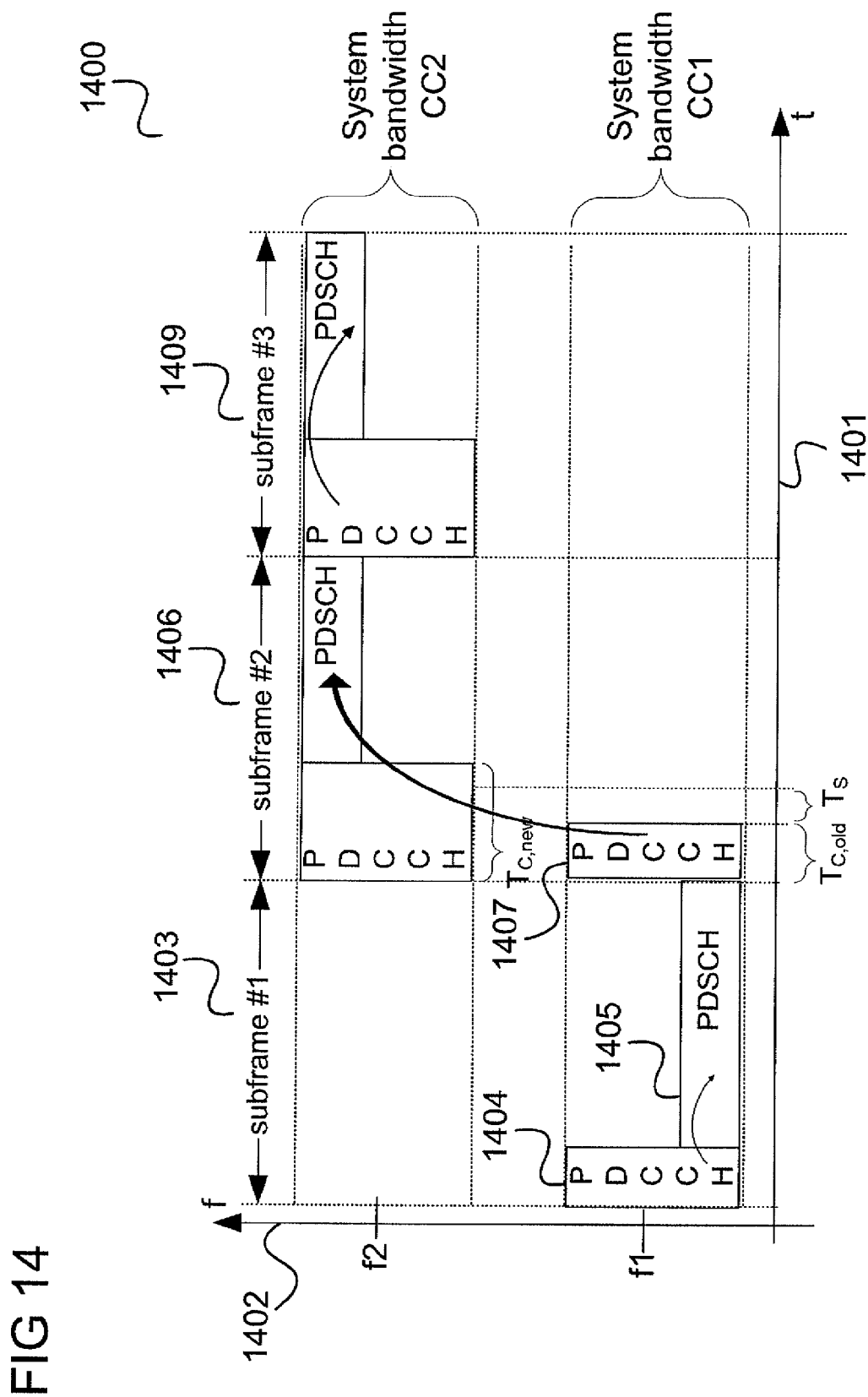

FIGS. 13 and 14 show time-frequency diagrams 1300, 1400.

As in FIGS. 11 and 12 time increases into the direction of a first axis 1301. 1401 (t-axis) and the frequency increases into the direction of a second axis 1302, 1402. Two component carriers indicated by their center frequencies f1 (component carrier CC1) and f2 (component carrier CC2) are involved in this example.

In this embodiment, it is assumed that it is not necessary that all carriers using the same number of OFDM Symbols in the control channel region, i.e. the number of OFDM Symbols sent via the PDCCH in a subframe may be different for different component carriers which is referred as different control channel durations for different component carriers in the following.

In this example, the duration of the control channel region of the component carrier CC1 is $T_{C,old}$ and $T_{C,new}$ for the component carrier CC2.

In case of different values for $T_C$, i.e. different control channel durations for component carriers CC1 and CC2, the mobile terminal 105 may be provided with individual switching delays for each cross carrier scheduling or the number of OFDM-Symbols used for the control channel region of the new component carrier may be indicated.

The procedure with a signalling of individual switching delays may for example be as follows.

The mobile terminal 105 transmits the value $T_R$ reflecting its re-tuning capabilities to the base station 103, i.e. transmits an indication of the time it needs to tune the transmitter and receiver to another component carrier than currently used. Several parameters may be included in this re-tuning capabilities transmission, e.g. specific values for certain switching distances (in frequency domain). An example for this is shown in table 1.

TABLE 1

| re-tuning capabilities of an UE transmitted by the UE to an eNodeB | |
|---|---|
| Re-tuning period $T_R$ expressed in OFDM-Symbol durations | Switching distance $f_{SD}$ |
| 1 | <500 MHz |
| 2 | ≥500 MHz |

The switching distance may be an optional value and only an example for an additional parameter. The value $T_R$ may be more important and is, in this embodiment, a mandatory parameter. In other words, the smallest set of re-tuning capabilities of the mobile terminal 105 consists of a single value $T_R$ in this embodiment.

The base station 103 stores the received re-tuning capabilities parameters in the context for this mobile terminal 105 to be used when allocating cross-carrier resources to the mobile terminal 105.

The base station 103 transmits a configuration message to the mobile terminal 105. This configuration message includes a list that contains one or more switching delays and a relating Identity. An example is given in table 2.

TABLE 2 switching delay configuration transmitted by an eNodeB to an UE

| Identity | Switching delay $T_S$ expressed in OFDM-Symbol durations |
|---|---|
| 1 | 1 |
| 2 | 2 |
| 3 | 4 |
| 4 | 6 |

The base station 103 and the mobile terminal 105 have an ongoing communication connection.

In a first subframe 1303, 1403 the mobile terminal 105 receives a first scheduling message 1304, 1404 from the base station 105 which indicates the component carrier CC1 for the following PDSCH transmission 1305, 1405.

The base station 103 decides to schedule the mobile terminal 105 to another component carrier. Therefore it transmits, in a second subframe 1306, 1406, a second scheduling message (resource allocation message) 1307, 1407 on the PDCCH to the mobile terminal 103 which allocates a resource of another component carrier than the one currently used, namely CC2 instead of CC1. The second scheduling message 1307, 1407 includes an identification from the list transmitted in the configuration message to indicate when the new resource is allocated. The switching delay is selected in such a way that it fulfils the requirement $T_{C,old}+T_S > T_{C,new}$ as it is illustrated in FIG. 13.

The second scheduling message 1307, 1407 may further include as parameters an identification of the component carrier to which the mobile terminal 105 should switch and a specification of the frequency position of allocated resources.

The mobile terminal 105 reads the second scheduling message 1307, 1407 on the PDCCH, tunes its receiver to the newly allocated component carrier CC2 and starts to receive data from the newly allocated resource after expiration of period $T_S$. The resource is implicitly released at the end of the slot.

In the third subframe 1309, 1409, the procedure is similar to the one in the first subframe 1303, 1403 but with CC2 instead of CC1.

This embodiment offers high flexibility for the operator of the communication system 100. It enables the base station 103 to configure the switching delay specific for each mobile terminal 105 and will therefore give efficient cross carrier scheduling with no loss of data during cross carrier switching.

The procedure with indication of the number of OFDM symbols used for the control channel region of the new component carrier may for example be as follows.

The base station 103 and the mobile terminal 105 are pre-configured with a cross-carrier scheduling delay value $T_S$. The value is for example a multiple of an OFDM symbol duration. This parameter is stored in the base station 103 and the mobile terminal 105.

The base station 103 and the mobile terminal 105 have an ongoing communication connection.

In a first subframe 1303, 1403 the mobile terminal 105 receives a first scheduling message 1304, 1404 from the base station 105 which indicates the component carrier CC1 for the following PDSCH transmission 1305.

The base station 103 decides to schedule the mobile terminal 105 to another component carrier. Therefore it transmits, in a second subframe 1306, 1406, a second scheduling message (resource allocation message) 1307, 1407 on the PDCCH to the mobile terminal 103 which allocates a resource of another component carrier than the one currently used, namely CC2 instead of CC1.

The second scheduling message 1307, 1407 may include as parameters the number of OFDM symbols of the control channel region of the new carrier (i.e. the information transmitted by the PCFICH of the new carrier), an identification of the component carrier to which the mobile terminal 105 should switch (i.e. of CC2) and the frequency position of the allocated resources.

The mobile terminal 105 reads the second scheduling message 1307, 1407 on the PDCCH and verifies based on the received and stored parameters whether the in equation $T_{C,old}+T_S > T_{C,new}$ holds.

If the in equation is valid, as shown in FIG. 13, it tunes its receiver to the newly allocated carrier and starts receiving data from the newly allocated resource after expiration of period $T_S$. $T_S$ is taken from an internal storage of the mobile terminal 105.

If the in equation is not valid, as shown in FIG. 14, the mobile terminal 105 tunes its receiver to the newly allocated carrier and starts receiving data from the newly allocated resource after the end of the control channel region.

In the third subframe 1309, 1409, the procedure is similar to the one in the first subframe 1303, 1403 with CC2 instead of CC1.

This embodiment enables cross carrier scheduling in case of different control channel region sizes with low effort and with minimal additional signaling especially with minimal signaling over the air interface.

Figure 15:
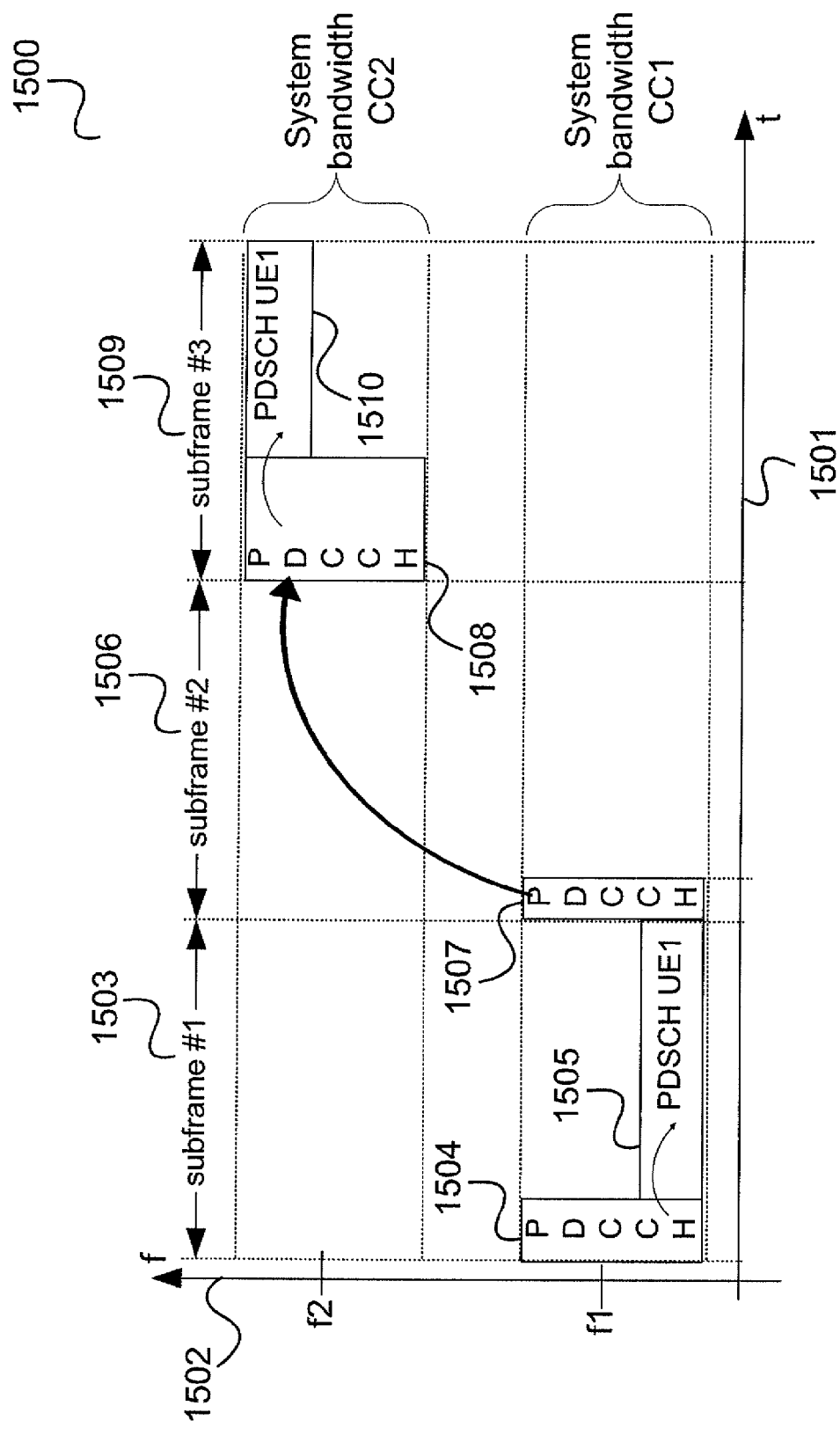
FIG. 15 shows a time-frequency diagram.

FIG. 15 shows a time-frequency diagram 1500.

The situation is similar to the embodiments described above, i.e. time increases into the direction of a first axis 1501 (t-axis) and the frequency increases into the direction of a second axis 1502 and there are two component carriers indicated by their center frequencies f1 (component carrier CC1) and f2 (component carrier CC2).

The base station 103 and the mobile terminal 105 have an ongoing communication connection.

In a first subframe 1503 the mobile terminal 105 receives a first scheduling message 1504 from the base station 105 which indicates the component carrier CC1 for the following PDSCH transmission 1505.

The base station 103 decides to schedule the mobile terminal 105 to another component carrier. Therefore it transmits, in a second subframe 1506 a second scheduling message (resource allocation message) 1507 on the PDCCH to the mobile terminal 105 which allocates a resource of another component carrier than the one currently used, namely CC2 instead of CC1. The second scheduling message 1507 for example includes an identification of the component carrier CC2 and the frequency position of allocated resources.

The mobile terminal 105 reads the second scheduling message 1507 on the PDCCH, tunes the receiver to the newly allocated carrier and starts reading a third scheduling message (resource allocation message) 1508 transmitted on the PDCCH of the new component carrier CC2 in a third subframe 1509.

The mobile terminal 1505 starts receiving data 1510 from the newly allocated component carrier after the end of the control channel region of the third subframe 1509.

This embodiment does not require any configuration relating to the switching delay. Nevertheless it enables cross carrier scheduling in case of different control channel region sizes. It is applicable for FDD mode and TDD mode of LTE In the embodiments described with reference to FIGS. 12 to 15 parts of the radio resources are unused by the switching mobile terminal.

In the following an embodiment is described with reference to FIG. 16 in which these radio resources are used.

Figure 16:
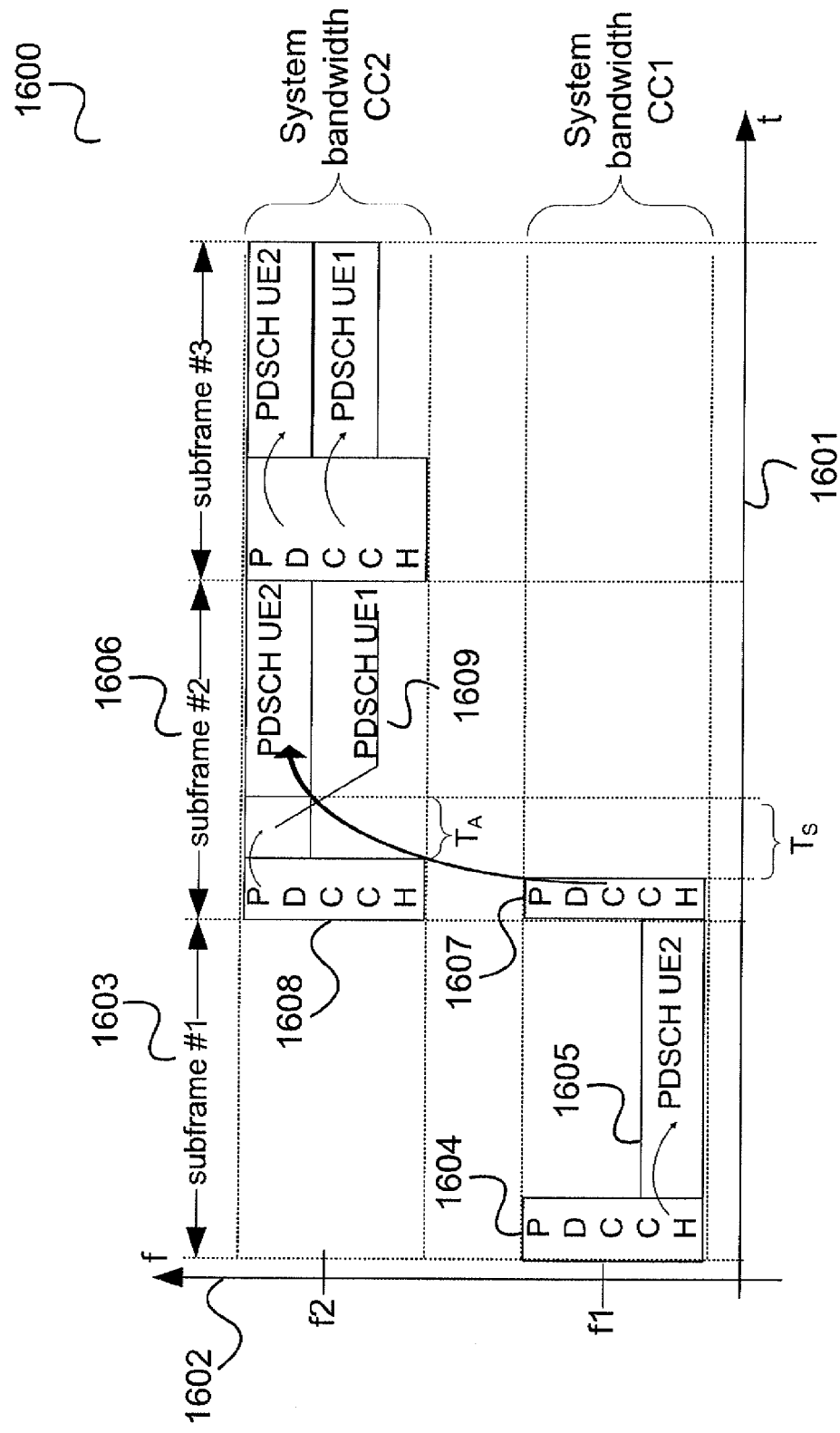
FIG. 16 shows a time-frequency diagram.

FIG. 16 shows a time-frequency diagram 1600.

The situation is similar to the embodiments described above, i.e. time increases into the direction of a first axis 1601 (t-axis) and the frequency increases into the direction of a second axis 1602 and there are two component carriers indicated by their center frequencies f1 (component carrier CC1) and f2 (component carrier CC2).

In this embodiment, the base station 103 has ongoing communication connections with a first mobile terminal 105 (denoted a UE1) and a second mobile terminal 105 (denoted a UE2).

In a first subframe 1603 the second mobile terminal 105 receives a first scheduling message 1604 from the base station 105 which indicates the component carrier CC1 for the following PDSCH transmission 1505.

An eNodeB in accordance with various embodiments has an ongoing connection with a UE 1 in accordance with various embodiments and decides to schedule the UE to a resource which is also used for cross carrier scheduling by UE 2 in the same subframe.

The base station 103 decides to schedule the second mobile terminal 105 to another component carrier. Therefore, the base station transmits, in a second subframe 1606 a second scheduling message (resource allocation message) 1607 on the PDCCH to the second mobile terminal 105 which allocates a resource of another component carrier than the one currently used, namely CC2 instead of CC1.

Furthermore, the base station 103 decides to schedule the first mobile terminal 105 to the component carrier CC2 to which the second mobile terminal 105 is also scheduled by cross carrier scheduling in accordance with the second scheduling message 1607.

Therefore it transmits, in a second subframe 1606 a third scheduling message (resource allocation message) 1608 on the PDCCH to the first mobile terminal 105 which allocates a resource that will be used by the second mobile terminal 105 in the later part of the second subframe 1606. The third scheduling message 1608 for example includes as parameters the allocation period $T_A$ and the frequency position of the allocated resources. The base station 103 selects $T_A$ in such a way that it fills up the unused part of the resource used by the second mobile terminal 105.

The first mobile terminal 105 starts receiving data 1609 from the allocated resource. It stops to receive data after expiration of period $T_A$.

This embodiment allows the usage of resources which cannot be used by the mobile terminal changing the component carrier itself.

This embodiment may be seen to provide a first communication device (e.g. a base station) that allocates communication resources which are unused during a delay time interval for switching a communication mode by a second communication device to be used by a third communication device.

In one embodiment, methods (e.g. for switching a communication mode) in accordance with the communication devices described above are provided. Examples for such methods are described in the following with reference to FIGS. 17 to 20.

FIG. 17 shows a flow diagram 1700.

In 1701, a communication circuit (e.g. of a communication device) communicates in a first communication mode using a first frequency range;

In 1702, a switching delay information message indicating a time interval by which start of communication in a second communication mode using a second frequency range should be delayed after a switch from the first communication mode to the second communication mode is received (e.g. by a receiver of the communication device).

In 1703, it is detected (e.g. by a detector of the communication device) whether the time interval has elapsed since the start of the switching from the first communication mode to the second communication mode if the communication circuit has started switching from the first communication mode to the second communication mode.

In 1704, the communication circuit communicates in the second communication mode when the time interval has elapsed since the start of the switching from the first communication mode to the second communication mode.

The communication circuit is for example part of a mobile terminal of a mobile communication system.

The switching delay information message is for example received from a base station of the mobile communication system.

In one embodiment, in the first communication mode, the communication circuit communicates using a plurality of sub-carriers having frequencies in the first frequency range and wherein in the second communication mode, the communication circuit communicates using a plurality of sub-carriers having frequencies in the second frequency range.

For example, in the first communication mode, the communication circuit communicates according to OFDM using the first frequency range and in the second communication mode, the communication circuit communicates according to OFDM using the second frequency range.

For example, in the first communication mode, the communication circuit communicates using a first LTE-A component carrier and in the second communication mode, the communication circuit communicates using a second LTE-A component carrier.

In one embodiment, the method further includes re-tuning from the first frequency range to the second frequency range for a switch from the first communication mode to the second communication mode.

The switching delay information message is for example received in the first communication mode.

The method may further include sending a required switching time information message specifying a required switching time interval required by the communication circuit to switch from the first communication mode to the second communication mode.

The method may further include receiving a switching request message indicating that the second communication mode is to be used for communicating and the communication circuit for example starts switching from the first communication mode to the second communication mode in reaction to receiving the switching request message.

The switching request message is for example a scheduling message specifying that the communication circuit may communicate in the second communication mode for a pre-defined transmission time. For example, the switching request message specifies one or more resource blocks or resource elements allocated to the communication device.

The communication circuit may for example receive data in the first communication mode using the first frequency range and in the second communication mode using the second frequency range. For example, the communication using the first frequency range and the second frequency range may be a downlink communication in a mobile communication system.

In one embodiment, the communication circuit is part of a mobile terminal of a mobile communication system, the delay information message is received from a base station of the mobile communication system and the communication circuit receives data from the base station in the first communication mode and in the second communication mode.

FIG. 18 shows a flow diagram 1800.

In 1801, a communication circuit (e.g. of a communication device) communicates in a first communication mode using a first frequency range.

In 1802 a switching delay information message is sent (e.g. by a a sending circuit of the communication device) to another communication device indicating a time interval by which start of communication in a second communication mode using a second frequency range should be delayed after a switch from the first communication mode to the second communication mode.

In 1803, it is detected (e.g. by a detector of the communication device) whether the time interval has elapsed since the start of the switching from the first communication mode to the second communication mode if the communication circuit has started switching from the first communication mode to the second communication mode.

In 1804, the communication circuit communicates in the second communication mode when the time interval has elapsed since the start of the switching from the first communication mode to the second communication mode.

The communication circuit is for example part of a base station of a mobile communication system, e.g. a cellular mobile communications system, for example according to LTE Advanced. Accordingly, the other communication device may be a mobile terminal of the mobile communication system.

The method may further include receiving a required switching time message from the other communication device specifying a required switching time interval required by the communication circuit to switch from the first communication mode to the second communication mode.

In one embodiment, the method may further include determining the time interval based on the required switching time interval. For example, the time interval may be determined such that it is at least as long as the required switching time interval.

In one embodiment, the method includes sending a switching request message indicating that the second communication mode is to be used for communicating and the communication circuit starts switching from the first communication mode to the second communication mode after sending the switching request message.

The switching request message is for example sent in the first communication mode.

The switching request message may be a scheduling message specifying that the other communication device may communicate in the second communication mode for a pre-defined transmission time.

The communication circuit for example sends data to the other communication device in the first communication mode using the first frequency range and in the second communication mode using the second frequency range.

In one embodiment, the communication circuit is part of a base station of a mobile communication system, the delay information message is sent to a mobile terminal of the mobile communication system and the communication circuit sends data to the mobile terminal in the first communication mode and in the second communication mode.

FIG. 19 shows a flow diagram 1900.

In 1901, a communication circuit (e.g. of a communication device) communicates in a first communication mode using a first frequency range.

In 1902, a switching request message indicating that a second communication mode using a second frequency range is to be used for communicating is received (e.g. by a receiver of the communication device).

In 1903, the communication circuit starts switching from the first communication mode to the second communication mode in reaction to receiving the switching request message.

In 1904, it is detected (e.g. by a detector of the communication device) whether a pre-defined time interval has elapsed since the start of the switching from the first communication mode to the second communication mode.

In 1905, the communication circuit is configured to communicate in the second communication mode when the pre-defined time interval has elapsed since the start of the switching from the first communication mode to the second communication mode.

The communication circuit is for example part of a mobile terminal of a mobile communication system.

In one embodiment, the switching request message is received from a base station of the mobile communication system.

For example, the switching request message is received in the first communication mode.

The method may further include receiving a switching delay information message including a specification of the pre-defined time interval.

In one embodiment, the communication circuit receives data in the first communication mode using the first frequency range and in the second communication mode using the second frequency range.

The communication circuit is for example part of a mobile terminal of a mobile communication system, the switching request message is received from a base station of the mobile communication system and the communication circuit receives data from the base station in the first communication mode and in the second communication mode.

FIG. 20 shows a flow diagram 2000.

In 2001, a communication circuit communicates in a first communication mode using a first frequency range.

In 2002, a switching request message is sent (e.g. by a sending circuit of the communication device) to another communication device indicating that a second communication mode using a second frequency range is to be used for communicating by the other communication device.

In 2003, it is detected (e.g. by a detector of the communication device) whether a pre-defined time interval has elapsed since the sending of the switching request message.

In 2004, the communication circuit communicates in the second communication mode when the pre-defined time interval has elapsed since the sending of the switching request message.

The communication circuit is for example part of a base station of a mobile communication system.

The other communication device may for example be a mobile terminal of the mobile communication system.

In one embodiment, the switching request message is sent in the first communication mode.

The method may further include sending a switching delay information message including a specification of the pre-defined time interval.

In one embodiment, the communication circuit sends data in the first communication mode to the other communication device using the first frequency range and in the second communication mode using the second frequency range.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
  a communication circuit configured to communicate in a first communication mode;
  a receiver configured to receive a switching delay information message indicating a pre-defined time interval by which start of communication in a second communication mode for carrying user and control data using a second frequency range according to a frame structure, wherein the frame structure comprises a plurality of radio frames each having a plurality of sub-frames, each sub-frame including a plurality of symbols, should be delayed after a switch from the first communication mode to the second communication mode, wherein the pre-defined time interval is shorter than one sub-frame, the pre-defined time interval is stored in the communication device, the pre-defined time interval is a multiple of an Orthogonal Frequency-Division Multiplexing (OFDM) symbol duration and the pre-defined time interval is at least one symbol long,
  a detector circuit configured to detect whether the pre-defined time interval has elapsed since the start of the switching from the first communication mode to the second communication mode if the communication circuit has started switching from the first communication mode to the second communication mode,
  wherein the communication circuit is configured to communicate in the second communication mode when the pre-defined time interval has elapsed since the start of the switching from the first communication mode to the second communication mode.

2. The communication device according to claim 1, wherein the communication device is a mobile terminal of a mobile communication system.

3. The communication device according to claim 2, wherein the switching delay information message is received from a base station of the mobile communication system.

4. The communication device according to claim 1, wherein in the first communication mode, the communication circuit communicates using a plurality of sub-carriers having frequencies in the first frequency range and wherein in the second communication mode, the communication circuit communicates using a plurality of sub-carriers having frequencies in the second frequency range.

5. The communication device according to claim 1, wherein in the first communication mode, the communication circuit communicates according to OFDM using the first frequency range and wherein in the second communication mode, the communication circuit communicates according to OFDM using the second frequency range.

6. The communication device according to claim 1, wherein the switching delay information message is received in the first communication mode.

7. The communication device according to claim 1, further comprising a sending circuit configured to send a required switching time information message specifying a required switching time interval required by the communication circuit to switch from the first communication mode to the second communication mode.

8. The communication device according to claim 1, wherein the receiver is configured to receive a switching request message indication that the second communication mode is to be used for communicating and wherein the communication circuit is configured to start switching from the first communication mode to the second communication mode in reaction to receiving the switching request message.

9. The communication device according to claim 1, wherein the communication circuit is configured to receive data in the first communication mode using the first frequency range and in the second communication mode using the second frequency range.

10. A method for switching a communication mode comprising:
  a communication circuit communicating in a first communication mode using a first frequency range;
  receiving a switching delay information message indicating a pre-defined time interval by which start of communication in a second communication mode for carrying user and control data using a second frequency range according to a frame structure, wherein the frame structure comprises a plurality of radio frames each having a plurality of sub-frames, each sub-frame including a plurality of symbols, should be delayed after a switch from the first communication mode to the second communication mode, wherein the pre-defined time interval is shorter than one sub-frame, the pre-defined time interval is stored in a communication device that includes the communication circuit, the pre-defined time interval is a multiple of an Orthogonal Frequency-Division Multiplexing (OFDM) symbol duration and at least one symbol long;
  detecting whether the pre-defined time interval has elapsed since the start of the switching from the first communication mode to the second communication mode if the communication circuit has started switching from the first communication mode to the second communication mode;
  communicating in the second communication mode when the pre-defined time interval has elapsed since the start of the switching from the first communication mode to the second communication mode.

11. A communication device comprising:
  a communication circuit configured to communicate in a first communication mode using a first frequency range;
  a sending circuit configured to send a switching delay information message to another communication device indicating a pre-defined time interval by which start of communication in a second communication mode for carrying user and control data using a second frequency range according to a frame structure, wherein the frame structure comprises a plurality of radio frames each having a plurality of sub-frames, each sub-frame including a plurality of symbols, should be delayed after a switch from the first communication mode to the second communication mode, wherein the pre-defined time interval is shorter than one sub-frame, the pre-defined time interval is stored in the communication device, the pre-defined time interval is a multiple of an Orthogonal Frequency-Division Multiplexing (OFDM) symbol duration and at least one symbol long, a detector circuit configured to detect whether the pre-defined time interval has elapsed since the start of the switching from the first communication mode to the second communication mode if the communication circuit has started switching from the first communication mode to the second communication mode, wherein the communication circuit is configured to communicate in the second communication mode when the pre-defined time interval has elapsed since the start of the switching from the first communication mode to the second communication mode.

12. The communication device according to claim 11, wherein the communication device is a base station of a mobile communication system.

13. The communication device according to claim 12, wherein the other communication device is a mobile terminal of the mobile communication system.

14. The communication device according to claim 11, further comprising a receiver configured to receive a required switching time message from the other communication device specifying a required switching time interval required by the communication circuit to switch from the first communication mode to the second communication mode.

15. The communication device according to claim 11, wherein the sending circuit is configured to send a switching request message indicating that the second communication mode is to be used for communicating and wherein the communication circuit is configured to start switching from the first communication mode to the second communication mode after sending the switching request message.

16. The communication device according to claim 11, wherein the switching request message is sent in the first communication mode.

17. The communication device according to claim 11, wherein the communication circuit is configured to send data to the other communication device in the first communication mode using the first frequency range and in the second communication mode using the second frequency range.

18. A mobile terminal comprising:
a communication circuit configured to communicate in a first communication mode using a first frequency range;
a receiver configured to receive a switching request message indicating that a second communication mode for carrying user and control data using a second frequency range according to a frame structure, wherein the frame structure comprises a plurality of radio frames each having a plurality of sub-frames, each sub-frame including a plurality of symbols, is to be used for communicating, wherein the communication circuit is configured to start switching from the first communication mode to the second communication mode in reaction to receiving the switching request message;
a detector circuit configured to detect whether a pre-defined time interval has elapsed since the start of the switching from the first communication mode to the second communication mode, wherein the pre-defined time interval is shorter than one sub-frame, the pre-defined time interval is stored in the mobile terminal, the pre-defined time interval is a multiple of an Orthogonal Frequency-Division Multiplexing (OFDM) symbol duration and at least one symbol long,
wherein the communication circuit is configured to communicate in the second communication mode when the pre-defined time interval has elapsed since the start of the switching from the first communication mode to the second communication mode.

19. The mobile terminal according to claim 18, wherein the switching request message is received from a base station of the mobile communication system.

20. The mobile terminal according to claim 18, wherein the communication circuit is configured to receive data in the first communication mode using the first frequency range and in the second communication mode using the second frequency range.

21. A base station comprising:
a communication circuit configured to communicate in a first communication mode using a first frequency range;
a sending circuit configured to send a switching request message to a communication device indicating that a second communication mode for carrying user and control data using a second frequency range according to a frame structure, wherein the frame structure comprises a plurality of radio frames each having a plurality of sub-frames, each sub-frame including a plurality of symbols, is to be used for communicating by the communication device,
a detector circuit configured to detect whether a pre-defined time interval has elapsed since the sending of the switching request message, wherein the pre-defined time interval is shorter than one sub-frame, the pre-defined time interval is stored in the base station, the pre-defined time interval is a multiple of an Orthogonal Frequency-Division Multiplexing (OFDM) symbol duration and at least one symbol long,
wherein the communication circuit is configured to communicate in the second communication mode when the pre-defined time interval has elapsed since the sending of the switching request message.

22. The base station according to claim 21, wherein the communication device is a mobile terminal of the mobile communication system.

23. The base station according to claim 21, wherein the communication circuit is configured to send data in the first communication mode to the communication device using the first frequency range and in the second communication mode using the second frequency range.

* * * * *